United States Patent
Takatsuka et al.

(10) Patent No.: US 9,432,602 B2
(45) Date of Patent: Aug. 30, 2016

(54) SOLID-STATE IMAGING DEVICE, DRIVING METHOD, AND ELECTRONIC DEVICE

(71) Applicant: Sony Corporation, Tokyo (JP)

(72) Inventors: Takafumi Takatsuka, Kanagawa (JP); Yusuke Oike, Kanagawa (JP); Masaki Sakakibara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 217 days.

(21) Appl. No.: 13/953,943

(22) Filed: Jul. 30, 2013

(65) Prior Publication Data

US 2014/0049675 A1    Feb. 20, 2014

(30) Foreign Application Priority Data

Aug. 16, 2012  (JP) ................... 2012-180433

(51) Int. Cl.
| | |
|---|---|
| *H04N 5/335* | (2011.01) |
| *H04N 5/369* | (2011.01) |
| *H04N 5/357* | (2011.01) |
| *H04N 5/363* | (2011.01) |

(52) U.S. Cl.
CPC ............ *H04N 5/3698* (2013.01); *H04N 5/357* (2013.01); *H04N 5/363* (2013.01)

(58) Field of Classification Search
CPC ....................................................... H04N 5/335
USPC ................................................... 348/297, 303
See application file for complete search history.

(56) References Cited

U.S. PATENT DOCUMENTS

| | | | |
|---|---|---|---|
| 2006/0262209 A1* | 11/2006 | Kishi ............................ | 348/297 |
| 2008/0266434 A1 | 10/2008 | Sugawa et al. | |
| 2009/0251582 A1 | 10/2009 | Oike | |
| 2010/0182469 A1* | 7/2010 | Takamiya ......... | H01L 27/14654 348/294 |

FOREIGN PATENT DOCUMENTS

| | | |
|---|---|---|
| JP | 2005-328493 | 11/2005 |
| JP | 2009-268083 | 11/2009 |

* cited by examiner

*Primary Examiner* — Joel Fosselman
(74) *Attorney, Agent, or Firm* — Chip Law Group

(57) ABSTRACT

There is provided a solid-state imaging device including a pixel array section having a plurality of unit pixels two-dimensionally arranged therein, the unit pixels including at least a photoelectric conversion section, a charge holding section, a transfer section, and a reset section, and a drive control section which controls driving of the unit pixels in a manner that a voltage as a signal level and a voltage as a reset level are each read out serially per row. The drive control section controls readout of the voltage of the charge holding section in accordance with initialization of the charge holding section performed by the reset section before the charge transfer by the transfer section.

11 Claims, 33 Drawing Sheets

FIG. 27
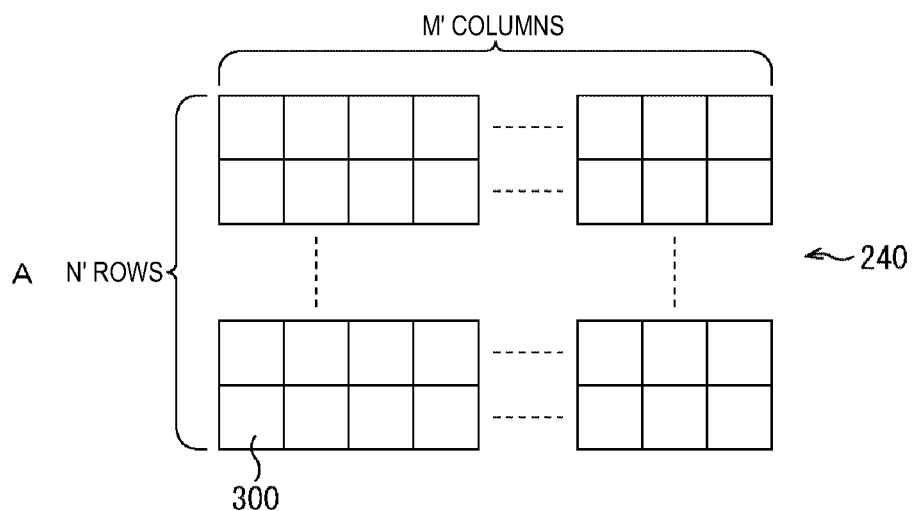
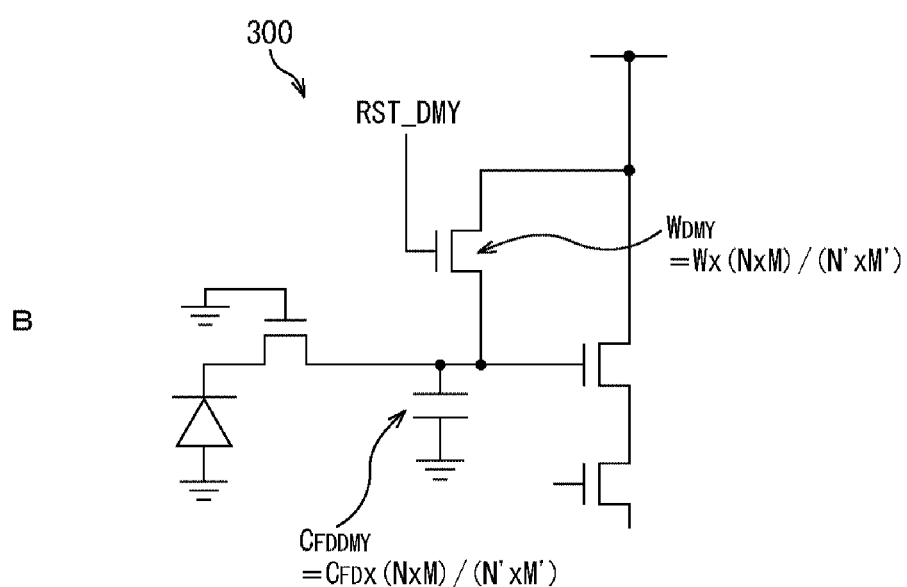

FIG. 29
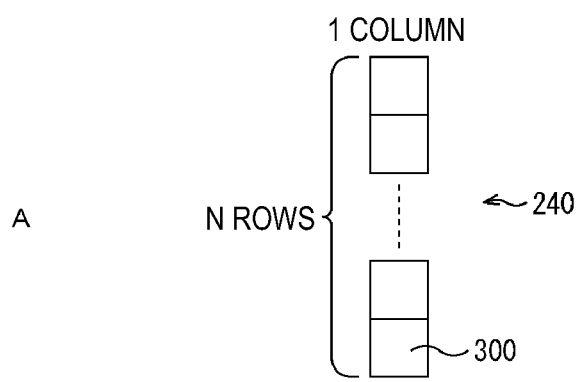
A
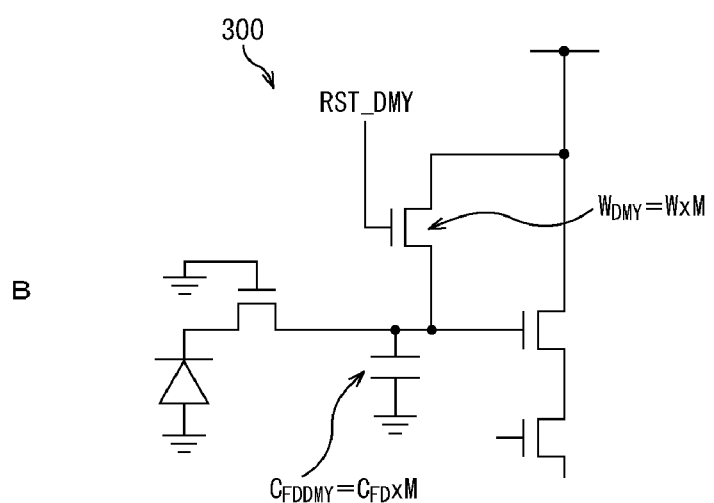
B

FIG. 31
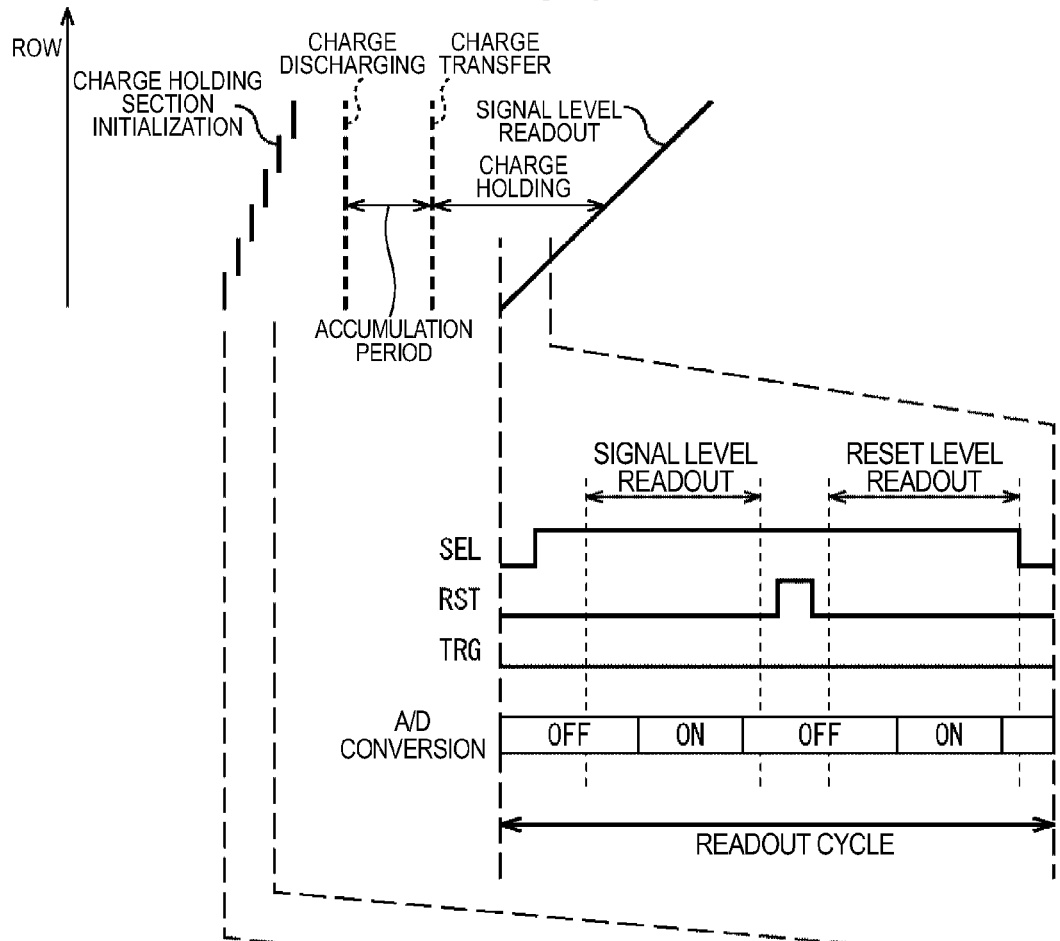
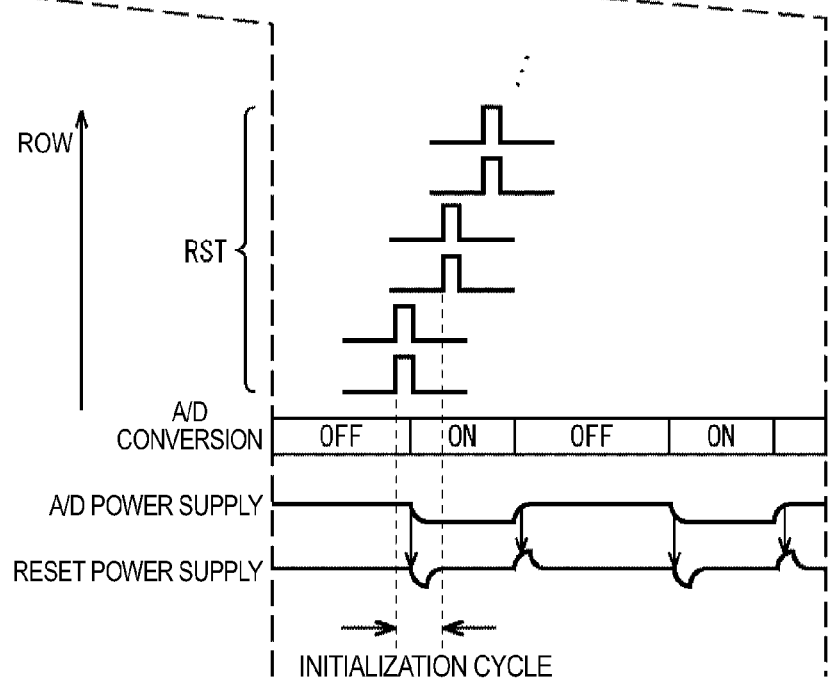

FIG. 33
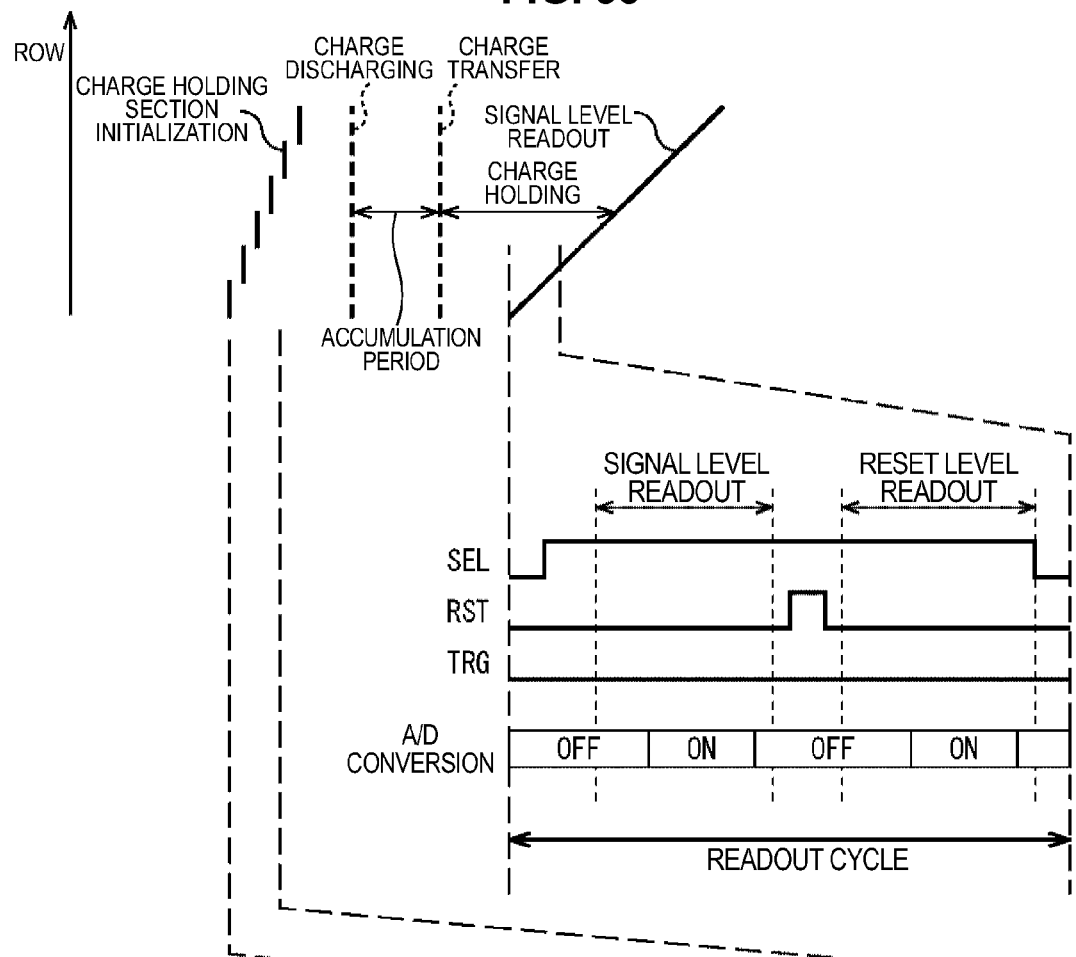
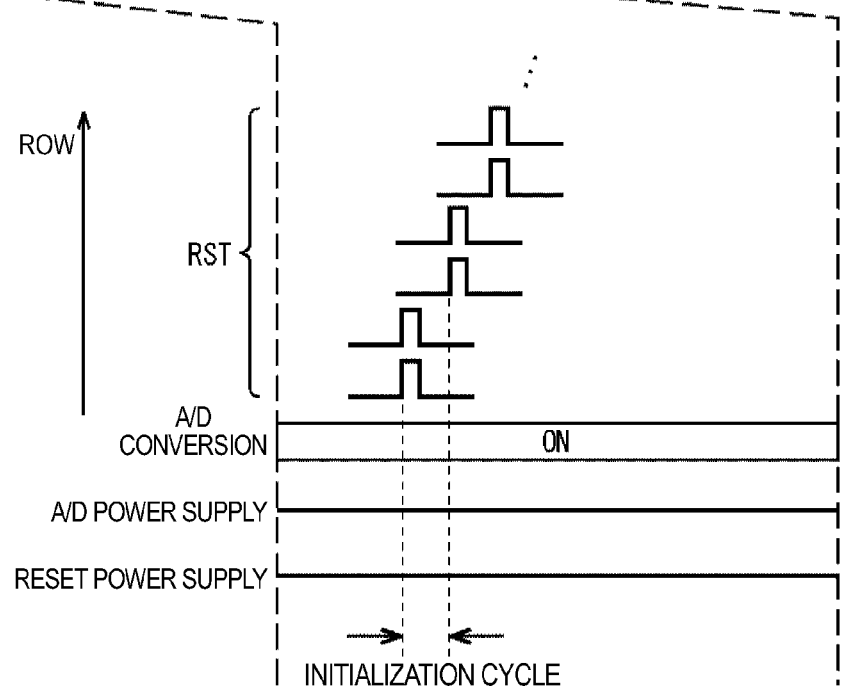

FIG. 34
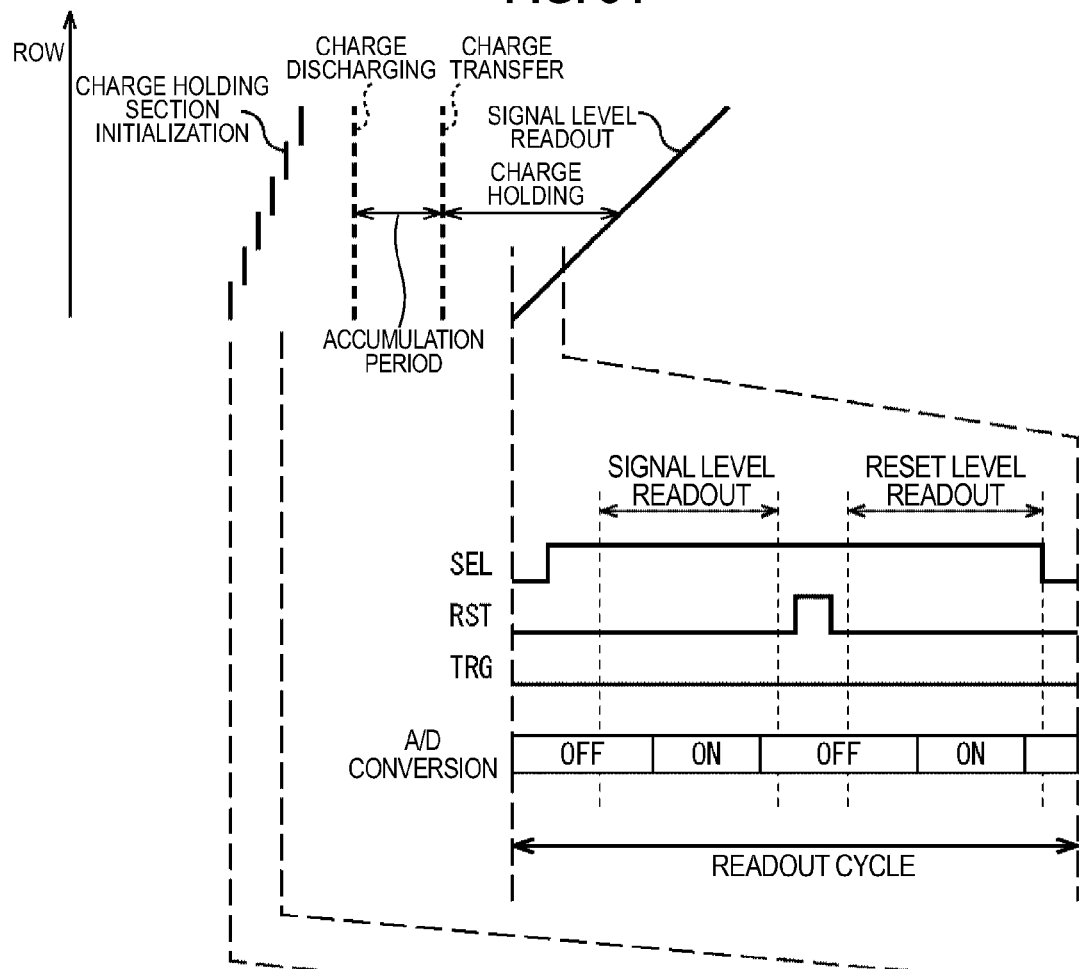
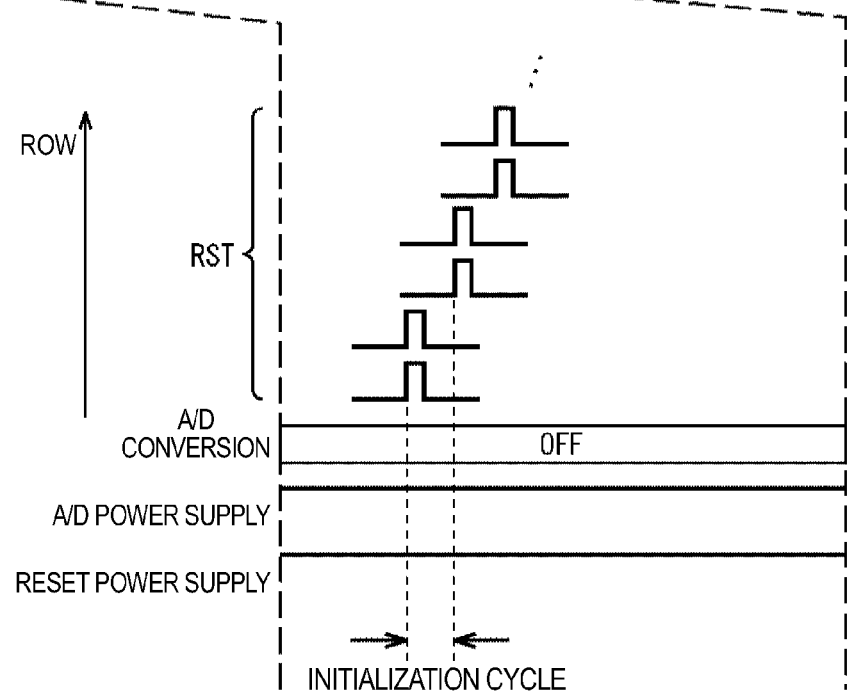

SOLID-STATE IMAGING DEVICE, DRIVING METHOD, AND ELECTRONIC DEVICE

BACKGROUND

The present technology relates to a solid-state imaging device, a driving method, and an electronic device, and particularly relates to a solid-state imaging device, a driving method, and an electronic device which make it possible to achieve a high image quality of a captured image.

In related art, an image sensor (solid-state imaging device), temporarily holds charges accumulated in a light-receiving section thereof in a charge-to-voltage conversion section (so-called floating diffusion; hereinafter, also referred to as a FD) or in a charge holding section such as a capacitive element provided separately from the FD in each pixel to thereby reduce discrepancies between pixels in sequential signal readout operations over an exposure/accumulation period (for example, JP 2009-268083A and JP 2005-328493A).

In addition, when reading out signals, the image sensor firstly reads out a voltage (signal level) corresponding to the charges accumulated in the charge holding section and then reads out a voltage (reset level) in effect when the charges accumulated in the charge holding section are reset. Based on the difference between the two levels, the image sensor removes noise.

In this, it is preferable that the voltage (hereinafter, referred to as a pre-transfer reset voltage) in effect when the charges in the charge holding section are reset (initialized) before the charges accumulated in the light-receiving section are transferred (before charge transfer) to the charge holding section should be equal to the reset level (hereinafter, referred to as a post-readout reset voltage) in effect when the signal is read out.

SUMMARY

Meanwhile, when the image sensor performs a global shutter operation in which signal charge accumulation is maintained in the same period as illustrated in FIG. 1, charge discharging (triangles in FIG. 1) before the start of exposure and charge transfer (rectangles) upon completion of exposure are performed in a batch of all pixels. In contrast, readout (oblong hexagons) of the signal level and the reset level is performed in units of a row.

Here, the charge holding section initialization (circles in FIG. 1) before charge transfer is performed in a batch of all pixels, there can be a large difference between the pre-transfer reset voltage and the post-readout reset voltage due to a voltage drop of power supply for a reset transistor designed to initialize (reset) the charge holding section and due to cross talk between the charge holding section and a reset signal line for supplying a reset voltage to the pixels of each adjacent rows. In addition, the load stemming from driving all pixels simultaneously causes a difference in transition timing in a reset operation from the reset operation at the time of signal readout, so that there is a large difference between the pre-transfer reset voltage and the post-readout reset voltage. Such a large difference between the pre-transfer reset voltage and the post-readout reset voltage produces noise (hereinafter, referred to as offset noise) attributable to an offset generated in output, thus degrading the image quality of a captured image.

To address this, as illustrated in FIG. 2, the charge holding section initialization before charge transfer (circles) is performed serially in row units. In this case, it is possible to reduce the offset noise, but takes a long time to perform the charge holding section initialization on all the rows. For this reason, the frame rate is deteriorated, and the image quality of a captured image (particularly, a moving image) is degraded.

The present technology has been provided under such circumstances and makes it possible to achieve a high image quality of a captured image.

According to an embodiment of the present technology, there is provided a solid-state imaging device including a pixel array section having a plurality of unit pixels two-dimensionally arranged therein, the unit pixels each including at least a photoelectric conversion section, a charge holding section which holds charges accumulated in the photoelectric conversion section, a transfer section which transfers the charges accumulated in the photoelectric conversion section to the charge holding section, and a reset section which resets the charges in the charge holding section, and a drive control section which controls driving of the unit pixels in a manner that a voltage as a signal level and a voltage as a reset level are each read out serially per row, the signal level corresponding to the charges accumulated in the charge holding section, the reset level corresponding to charges in the charge holding section after the reset section resets the accumulated charges. The drive control section controls readout of the voltage of the charge holding section in accordance with initialization of the charge holding section performed by the reset section before the charge transfer by the transfer section.

The drive control section may control the driving of the unit pixels in a manner that the transfer section performs one or both of the charge transfer and charge discharging from the photoelectric conversion section in a batch of all the unit pixels in the pixel array section.

The drive control section may control the driving of the unit pixels in a manner that the reset section performs the charge resetting in reading out the voltage of the charge holding section on a readout row and a non-readout row which is other than the readout row when a number of initialization rows is larger than a number of the readout rows in the pixel array section, the readout row including the charge holding section of which voltage is simultaneously read out, the initialization row including the charge holding section which is simultaneously initialized before the charge transfer by the transfer section.

The non-readout row may be, in the pixel array section, an omitted row where the voltage of the charge holding section is not read out, a pixel row including dummy pixels for intensity correction, or a pixel row including pixels in an OPB (Optical Black) region.

The non-readout row may include dummy pixels provided separately from the unit pixels in the pixel array section. The drive control section may perform the driving of the unit pixels and the dummy pixels.

The non-readout row may be arranged on one or each of an upper side and a lower side of the pixel array section.

The non-readout row may have the dummy pixels arranged in a row direction of the pixel array section.

The non-readout row may have the dummy pixels arranged in a column direction of the pixel array section.

The solid-state imaging device may include a switching section which switches over the dummy pixels to be connected to a driver driving the dummy pixels.

When the initialization rows in N rows include the unit pixels a number of which is N×M, the drive control section may control driving of the dummy pixels a number of which is K. Each of the dummy pixels may include at least a dummy pixel reset section having a drive capability which is substantially (N×M)/K times of a drive capability of the reset section of each of the unit pixels, and a dummy pixel charge holding section having a capacity which is substantially (N×M)/K times of a capacity of the charge holding section of each of the unit pixel.

The dummy pixels the number of which is K may be arranged in a form of a matrix of N'×M' (N'≤N, M'≤M).

At a time of the initialization of the charge holding section before the charge transfer by the transfer section, the drive control section may keep activating or deactivating an operation of a column circuit which operates per column in accordance with a readout cycle for reading out the signal level and the reset level of the charge holding section.

The column circuit may be an A/D (Analog to Digital) conversion circuit.

The drive control section may control the driving of the unit pixels in a manner that the reset section initializes the charge holding section every a plurality of rows not adjacent to one another in the pixel array section before the charge transfer by the transfer section.

The drive control section may control the driving of the unit pixels in a manner that the reset section initializes the charge holding section in a batch of all the unit pixels in the pixel array section before the charge transfer by the transfer section.

The charge holding section may be a charge-to-voltage conversion section connected to an amplification section that reads out the voltage of the charge holding section.

The charge holding section may be a capacitive element provided separately from a charge-to-voltage conversion section connected to an amplification section that reads out the voltage of the charge holding section.

The solid-state imaging device may further include a calculation section which calculates a difference between the signal level and the reset level.

According to an embodiment of the present technology, there is provided a method for driving a solid-state imaging device which includes a pixel array section having a plurality of unit pixels two-dimensionally arranged therein, the unit pixels each including at least a photoelectric conversion section, a charge holding section which holds charges accumulated in the photoelectric conversion section, a transfer section which transfers the charges accumulated in the photoelectric conversion section to the charge holding section, and a reset section which resets the charges in the charge holding section, and a drive control section which controls driving of the unit pixels in a manner that a voltage as a signal level and a voltage as a reset level are each read out serially per row, the signal level corresponding to the charges accumulated in the charge holding section, the reset level corresponding to charges in the charge holding section after the reset section resets the accumulated charges, the method including controlling, by the solid-state imaging device, readout of the voltage of the charge holding section in accordance with initialization of the charge holding section before the charge transfer by the transfer section.

According to an embodiment of the present technology, there is provided an electronic device comprising a solid-state imaging device, the solid-state imaging device including a pixel array section having a plurality of unit pixels two-dimensionally arranged therein, the unit pixels each including at least a photoelectric conversion section, a charge holding section which holds charges accumulated in the photoelectric conversion section, a transfer section which transfers the charges accumulated in the photoelectric conversion section to the charge holding section, and a reset section which resets the charges in the charge holding section, and a drive control section which controls driving of the unit pixels in a manner that a voltage as a signal level and a voltage as a reset level are each read out serially per row, the signal level corresponding to the charges accumulated in the charge holding section, the reset level corresponding to charges in the charge holding section after the reset section resets the accumulated charges. The drive control section controls readout of the voltage of the charge holding section in accordance with initialization of the charge holding section before the charge transfer by the transfer section.

According to the one embodiment of the present technology, readout of the voltage of the charge holding section is controlled in accordance with the charge holding section initialization before charge transfer by the transfer section.

According to the one embodiment of the present technology, it is possible to achieve a high image quality of a captured image.

BRIEF DESCRIPTION OF THE DRAWINGS

FIG. 27 is a diagram illustrating another dummy-pixel-configuration example;

FIG. 29 is a diagram illustrating yet another dummy-pixel-configuration example;

FIG. 31 is a diagram illustrating an example of driving a solid-state imaging device in related art;

FIG. 33 is a diagram illustrating an example of driving a solid-state imaging device according to a second embodiment of the present technology;

FIG. 34 is a diagram illustrating another example of driving the solid-state imaging device according to the second embodiment of the present technology.

DETAILED DESCRIPTION OF THE EMBODIMENT(S)

Figure 1:
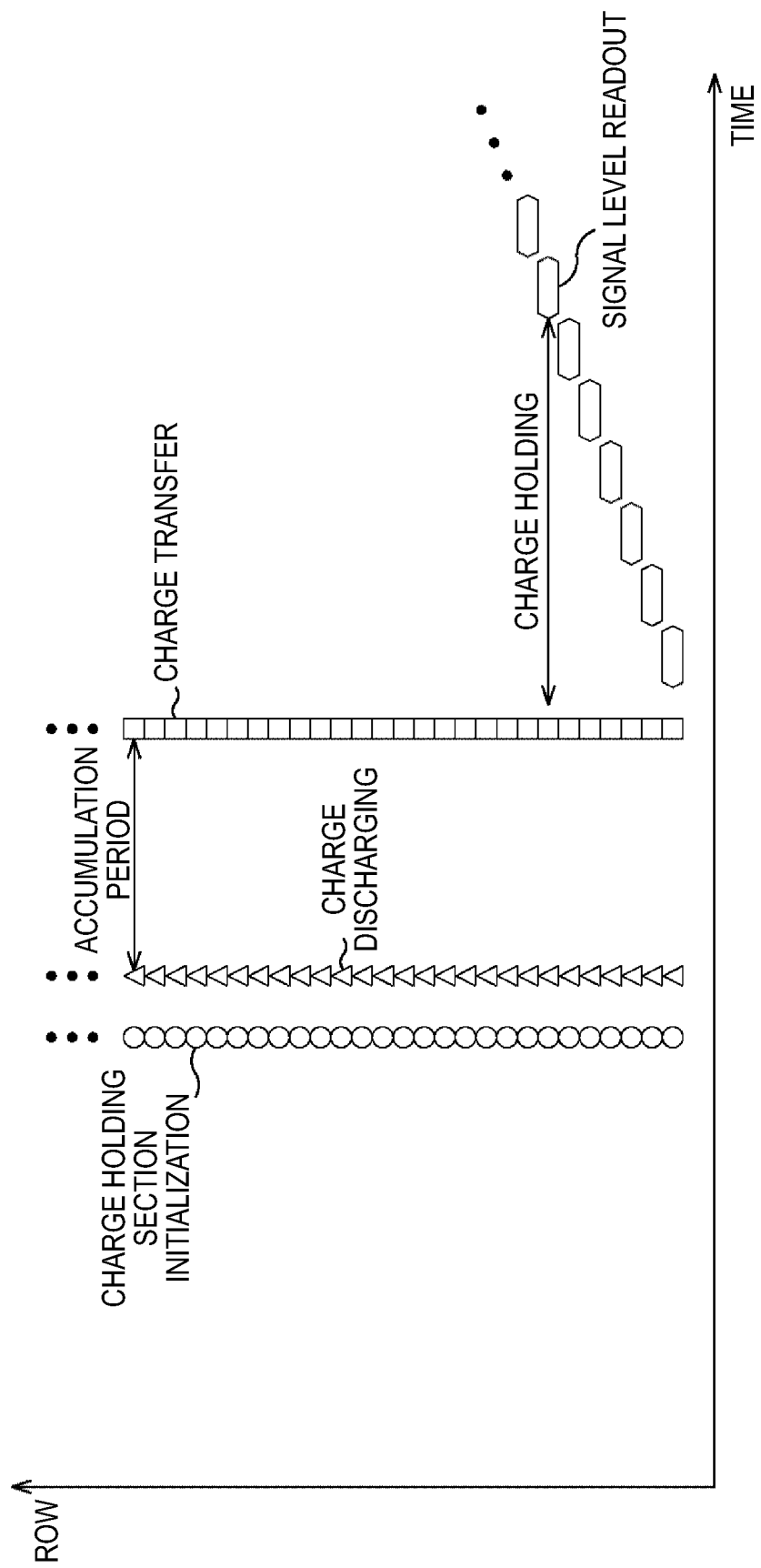
FIG. 1 is a diagram illustrating operation of a solid-state imaging device in related art.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

INTRODUCTION

The solid-state imaging device in related art has a large difference between a pre-transfer reset voltage and a post-readout reset voltage to cause offset noise in output, thus having a risk of a degraded image quality of a captured image.

Figure 3:
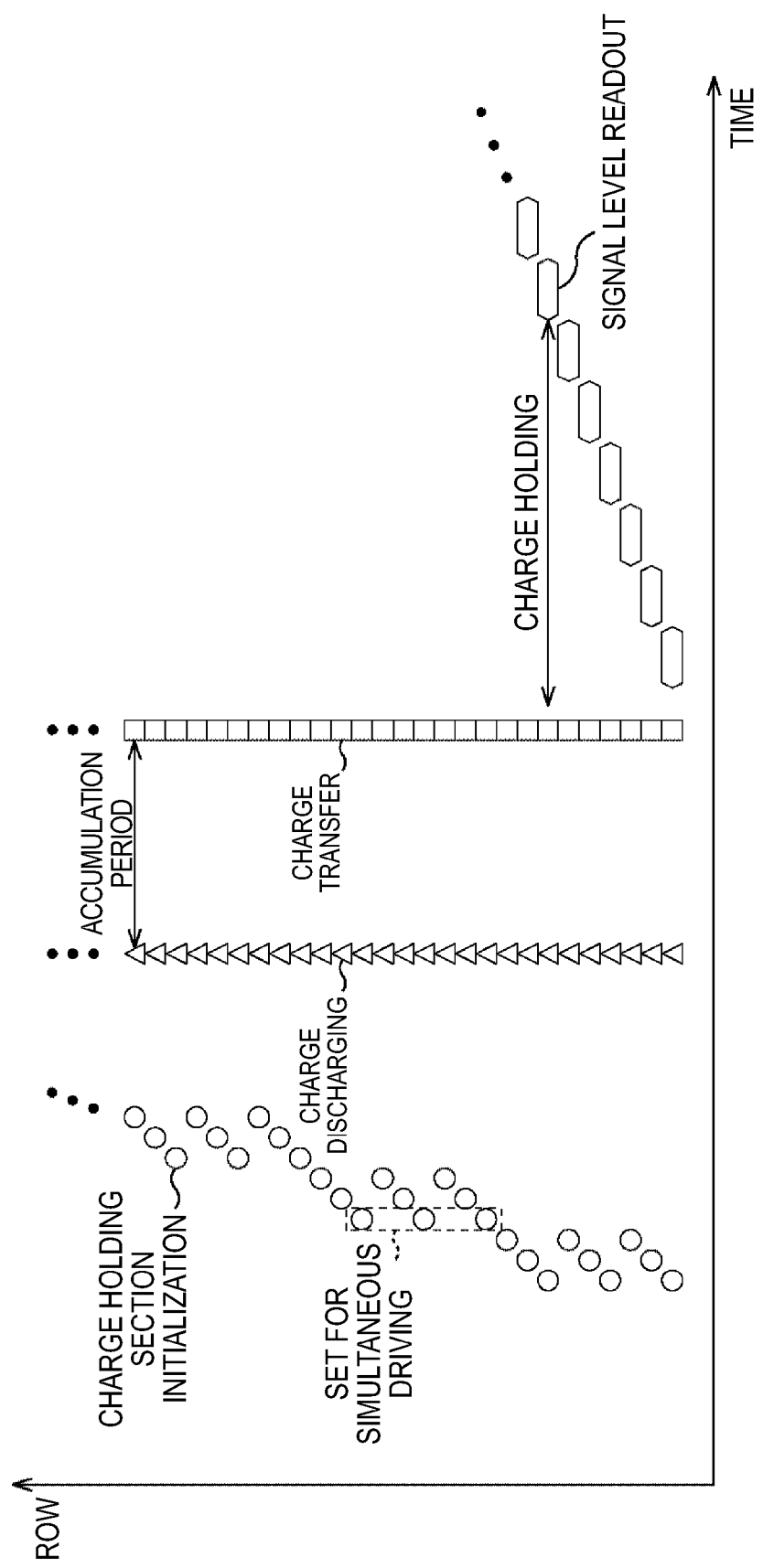
FIG. 3 is a diagram illustrating operation of a solid-state imaging device in related art.

To address this, the applicant discloses that an operation of initializing a charge holding section before charge transfer is serially performed in units of a plurality of rows not adjacent to one another, more specifically in units of, for example, a set of three rows at intervals of two rows in Japanese Patent Application No. 2010-279509, as illustrated in FIG. 3.

This makes it possible to prevent: a voltage drop in power supply for reset transistors caused by the charge holding section initialization in a batch of all pixels; and cross talk between the charge holding section and adjacent reset signal lines. Also, the load stemming from driving all pixels simultaneously in a reset operation can be reduced, and thus the transition timing of the reset operation can be set as in the reset operation in reading out a signal.

This makes it possible to reduce the difference between the pre-transfer reset voltage and the post-readout reset voltage and thus to prevent occurrence of offset noise. Thus, it is possible to achieve a high image quality of a captured image.

Hereinbelow, descriptions are given of configurations each for achieving a higher image quality of a captured image. Note that the descriptions are given in the following order.

<1. Solid-State Imaging Device to which Present Technology is Applied>
<2. First Embodiment of Present Technology>
<3. Second Embodiment of Present Technology>
<4. Electronic Device to which Present Technology is Applied>

1. Solid-State Imaging Device to which Present Technology is Applied

[Configuration of Solid-State Imaging Device]

Figure 4:
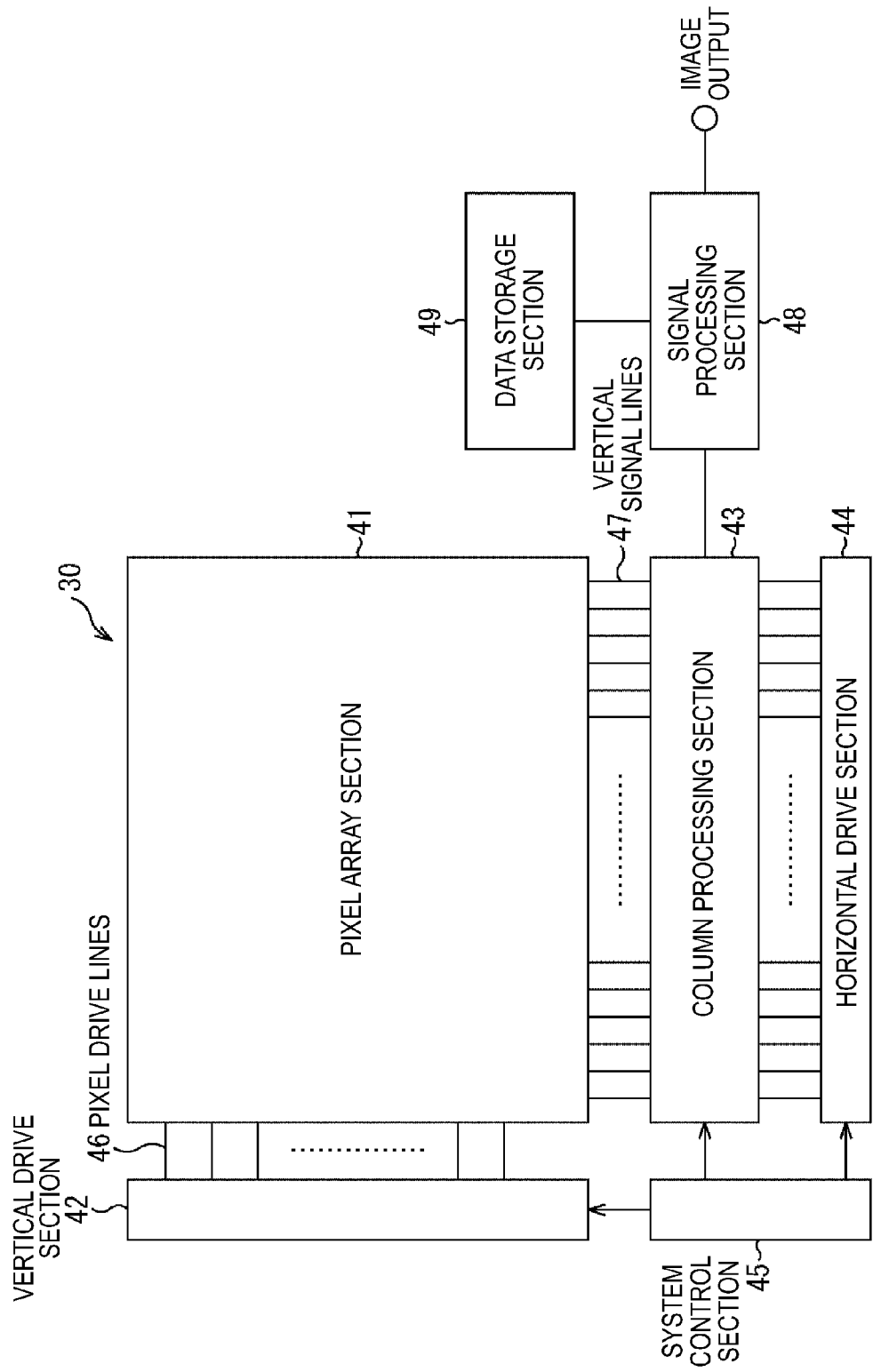
FIG. 4 is a diagram illustrating a configuration example of a solid-state imaging device to which embodiments of the present technology are applied.

FIG. 4 is a block diagram illustrating a configuration example of a CMOS (Complementary Metal Oxide Semiconductor) image sensor which is a solid-state imaging device to which the present technology is applied.

A CMOS image sensor 30 includes a pixel array section 41, a vertical drive section 42, a column processing section 43, a horizontal drive section 44, and a system control section 45. The pixel array section 41, the vertical drive section 42, the column processing section 43, the horizontal drive section 44, and the system control section 45 are formed on a semiconductor substrate (chip) not shown in the figure.

In the pixel array section 41, unit pixels (unit pixels 50 in FIG. 5) are two-dimensionally arranged in a matrix form, the unit pixels each having a photoelectric transducer generating photocharges in a charge amount corresponding to an amount of incident light and accumulating the photocharges therein. Note that, depending on the case, the photocharges in a charge amount corresponding to an amount of incident light are simply referred to as "charges", and the unit pixels are simply referred to as "pixels".

Further in the pixel array section 41, pixel drive lines 46 are formed, in a right-left direction in the figure (direction of arranging pixels in a pixel row), for respective rows with respect to the pixel arrays arranged in the matrix form, and vertical signal lines 47 are formed, in an up-down direction (arrangement direction of pixels in a pixel column) in the figure, for respective columns. One end of each pixel drive line 46 is connected to an output end of the vertical drive section 42.

The CMOS image sensor 30 further includes a signal processing section 48 and a data storage section 49. The signal processing section 48 and the data storage section 49 may be provided on a substrate different from that for the CMOS image sensor 30, as, for example, a DSP (Digital Signal Processor) circuit, or may be mounted on the same substrate as that for the CMOS image sensor 30.

The vertical drive section 42 is configured of a shift register, an address decoder and the like, and is a pixel drive section driving the individual pixels of the pixel array section 41 simultaneously for all pixels, or in row units, or the like. This vertical drive section 42, the specific configuration of which is omitted in the figure, includes: a readout scanning system and a sweep scanning system; or a readout scanning system and batch sweep and batch transfer systems.

To read signals from the unit pixels of the pixel array section 41, the readout scanning system performs selective scanning on the unit pixels serially in row units. In the case of row-based driving (rolling shutter operation), the sweep scanning is performed on a read out row to undergo readout scanning by the readout scanning system, preceding the readout scanning by a time equivalent to a shutter speed. In the case of global exposure (global shutter operation), the batch sweep precedes the batch transfer by the time equivalent to the shutter speed.

By the sweeping, unrequired charges are swept out of the photoelectric transducers of the unit pixels in the read-out row (are reset). By this sweeping (resetting) of the unrequired charges, so-called electronic shutter operation is performed. Herein, the electronic shutter operation is an operation of discarding the charges of the photoelectric transducers and newly starting exposure (starting accumulation charges).

A signal read out by a readout operation due to the readout scanning system corresponds to an amount of light having been incident after an immediately preceding readout operation or electronic shutter operation. In the case of the row-based driving, a time period from readout timing due to the immediately preceding readout operation or sweep timing due to electronic shutter operation to readout timing due to the current readout operation is an accumulation time (exposure time) of the photocharges in each unit pixel. In the case of the global exposure, a time period from the batch sweep to the batch transfer is the accumulation time (exposure time).

Pixel signals outputted from individual unit pixels in pixel row having undergone selective scanning due to the vertical drive section 42 are supplied to the column processing section 43 through the respective vertical signal lines 47. The column processing section 43 performs predetermined signal processing on the pixel signals outputted from the individual unit pixels in selected row through the vertical signal line 47 for the respective pixel columns of the pixel array section 41, and in addition, temporarily holds the pixel signals after the signal processing.

Specifically, the column processing section 43 performs at least noise removing processing, for example, CDS (Correlated Double Sampling) processing as the signal processing. By this CDS processing due to the column processing section 43, fixed pattern noises intrinsic to pixels such as reset noise and scattering of thresholds of amplification transistors is removed. The column processing section 43 can be provided not only with the function of the noise removing processing but, for example, with an A/D (Analog Digital) conversion function, so as to output signal levels in digital signals.

The horizontal drive section 44 is configured of a shift register, an address decoder and the like, and sequentially selects unit circuits corresponding to individual pixel columns in the column processing section 43. By selective scanning due to this horizontal drive section 44, the pixel signals having undergone the signal processing in the column processing section 43 are sequentially outputted to the signal processing section 48.

The system control section 45 is configured of a timing generator generating various timing signals, and the like, and performs drive controls on the unit pixel by controlling drive of the vertical drive section 42, column processing section 43, horizontal drive section 44 and the like based on the various timing signals generated by the relevant timing generator.

The signal processing section 48 has at least an addition processing function, and performs various kinds of signal processing such as the addition processing on the pixel signals outputted from the column processing section 43. The data storage section 49 temporarily stores data used for such processing as the signal processing in the signal processing section 48.

[Circuit Configuration Example of Unit Pixel]

Figure 5:
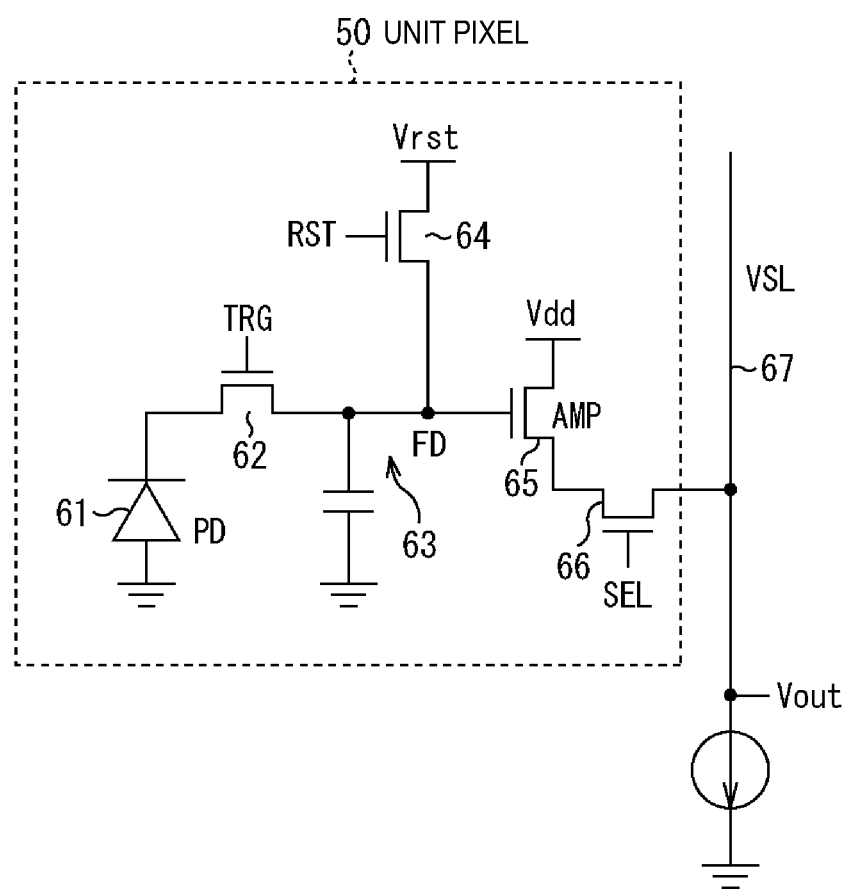
FIG. 5 is a diagram illustrating a unit-pixel-configuration.

Next, a description is given of a circuit configuration example of the unit pixels 50 in FIG. 5 which are arranged in the matrix form in the pixel array section 41.

In FIG. 5, each unit pixel 50 includes a photodiode (PD) 61, a transfer gate 62, a floating diffusion (FD) 63, a reset transistor 64, an amplification transistor 65, a select transistor 66, and a vertical signal line 67.

An anode of the photo diode 61 is grounded, and a cathode of the photo diode 61 is connected to a source of the transfer gate 62. A drain of the transfer gate 62 is connected to a drain of the reset transistor 64 and a gate of the amplification transistor 65. The contact point thereof forms the floating diffusion 63 serving as a charge-to-voltage conversion section.

A source of the reset transistor 64 is connected to a predetermined power supply Vrst, and a source of the amplification transistor 65 is connected to a predetermined power supply Vdd. A drain of the amplification transistor 65 is connected to a source of the select transistor 66, and a drain of the select transistor 66 is connected to the vertical signal line (VSL) 67. The vertical signal line 67 is connected to a constant current source of a source-follower circuit.

A gate of the transfer gate 62, a gate of the reset transistor 64, and a gate of the select transistor 66 are connected to the vertical drive section 42 in FIG. 4 through not shown control lines, respectively, and are supplied with pulses as drive signals.

The photo diode 61 photoelectrically converts incident light, generates charges corresponding to a light amount thereof, and accumulates the charges therein.

The transfer gate 62 turns on/off transfer from the photo diode 61 to the floating diffusion 63 in accordance with a drive signal TRG supplied from the vertical drive section 42. For example, the transfer gate 62 transfers the charges accumulated in the photo diode 61 to the floating diffusion 63 when the drive signal TRG at an H (High) level is supplied thereto, and stops the transfer of the charges when the drive signal TRG at an L (Low) level is supplied. Note that while the transfer gate 62 is stopping the charge transfer to the floating diffusion 63, the charges photoelectrically converted by the photo diode 61 are accumulated in the photo diode 61.

The floating diffusion 63 accumulates therein the charges transferred from the photo diode 61 through the transfer gate 62 and converts the charges into a voltage. When the CMOS image sensor 30 performs the global shutter operation, the floating diffusion 63 serves as a charge holding section where the charges accumulated in the photo diode 61 during the exposure time period are held.

The reset transistor 64 turns on/off discharging of the charges accumulated in the floating diffusion 63 in accordance with a drive signal RST supplied from the vertical drive section 42. For example, when supplied with the H-level drive signal RST, the reset transistor 64 clamps the floating diffusion 63 to a supply voltage Vrst and discharges (resets) the charges accumulated in the floating diffusion 63. When supplied with the L-level drive signal RST, the reset transistor 64 places the floating diffusion 63 into an electrically floating state.

The amplification transistor 65 amplifies a voltage corresponding to the charges accumulated in the floating diffusion 63. The voltage (voltage signal) amplified by the amplification transistor 65 is outputted to the vertical signal line 67 through the select transistor 66.

The select transistor 66 turns on/off output of a voltage signal from the amplification transistor 65 to the vertical signal line 67 in accordance with a drive signal SEL supplied from the vertical drive section 42. For example, the select transistor 66 outputs a voltage signal to the vertical signal line 67 when the H-level drive signal SEL is supplied thereto, and stops the output of the voltage signal when the L-level drive signal SEL is supplied thereto.

In this way, the unit pixel 50 is driven in accordance with the drive signals TRG, RST, and SEL which are supplied from the vertical drive section 42.

[Driving Example of Unit Pixel]

Next, an example of driving each unit pixel 50 will be described with reference to a timing chart in FIG. 6.

Firstly, when drive signals RST and TRG are applied in a pulsed manner during a period from time t1 to time t2, charges accumulated in the photo diode 61 and the floating diffusion 63 are discharged.

In this way, the charges accumulated in the photo diode 61 so far are swept out, and charges newly obtained from light from a subject are accumulated in the photo diode 61 during a period from time t2 to time t5. Note that during a period from time t3 to time t4, the charges accumulated in the floating diffusion 63 serving as the charge holding section are initialized (reset) by applying the drive signal RST in the pulsed manner.

When the drive signal TRG is applied in the pulsed manner during a period from time t5 to time t6, the charges accumulated in the photo diode 61 are transferred to the floating diffusion 63 by the transfer gate 62. Thereafter, a period from time t6 to time t7 is a charge holding time period.

When a drive signal SEL is changed from the L level to the H level during a period from time t7 to time t8, a voltage corresponding to the charges accumulated in the floating diffusion 63 is read out as a signal level until the drive signal RST is changed to the H level at time t9.

When the drive signal RST is changed to the H level during a period from time t9 to time t10, the charges accumulated in the floating diffusion 63 are reset (discharged) by the reset transistor 64. The reset state continues until the drive signal SEL is changed to the L level at time t11, and a voltage as a reset level is read out in the meantime. In this way, the CDS processing for removing noise by obtaining a difference between the reset level and the signal level which are read out, and thereby a pixel signal with noise removed is read out.

The configuration of the unit pixel operating as described above may be employed for configurations other than the configuration of the unit pixel illustrated in FIG. 5. Hereinbelow, descriptions are given of the other configurations of unit pixels to which the present technology is applicable. In the following drawings, elements corresponding to those in FIG. 5 are denoted with the same reference numerals, and repeated explanation thereof is appropriately omitted.

[Another Circuit Configuration Example of Unit Pixel]

Figure 7:
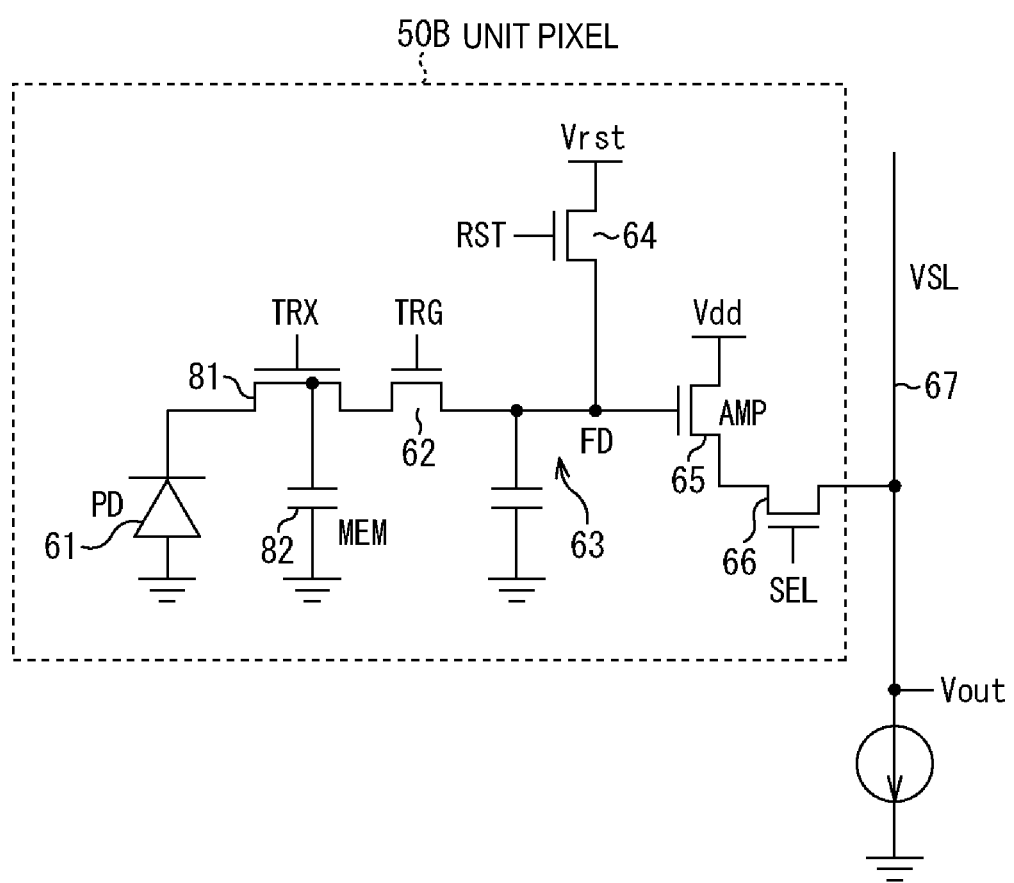
FIG. 7 is a diagram illustrating another unit-pixel-configuration example.

FIG. 7 is a diagram illustrating another circuit configuration example of the unit pixel 50.

In addition to the configuration in FIG. 5, a unit pixel 50B in FIG. 7 includes a transfer gate 81 and a memory section (MEM) 82 which are provided between the photo diode 61 and the transfer gate 62.

When a drive signal TRX is applied to a gate electrode of the transfer gate 81, the transfer gate 81 thereby transfers charges photoelectrically converted and accumulated in the photo diode 61 to the memory section 82. The memory section 82 accumulates therein the charges transferred from the photo diode 61 by the transfer gate 81.

When a drive signal TRG is applied to the gate electrode of the transfer gate 62, the transfer gate 62 transfers the charges accumulated in the memory section 82 to the floating diffusion 63.

In other words, in the unit pixel 50B in FIG. 7, the floating diffusion 63 and the memory section 82 serve as the charge holding sections, and the charge holding section initialization operation is performed by applying a drive signal RST and a drive signal TRG in the pulsed manner.

[Still Another Circuit Configuration Example of Unit Pixel]

Figure 8:
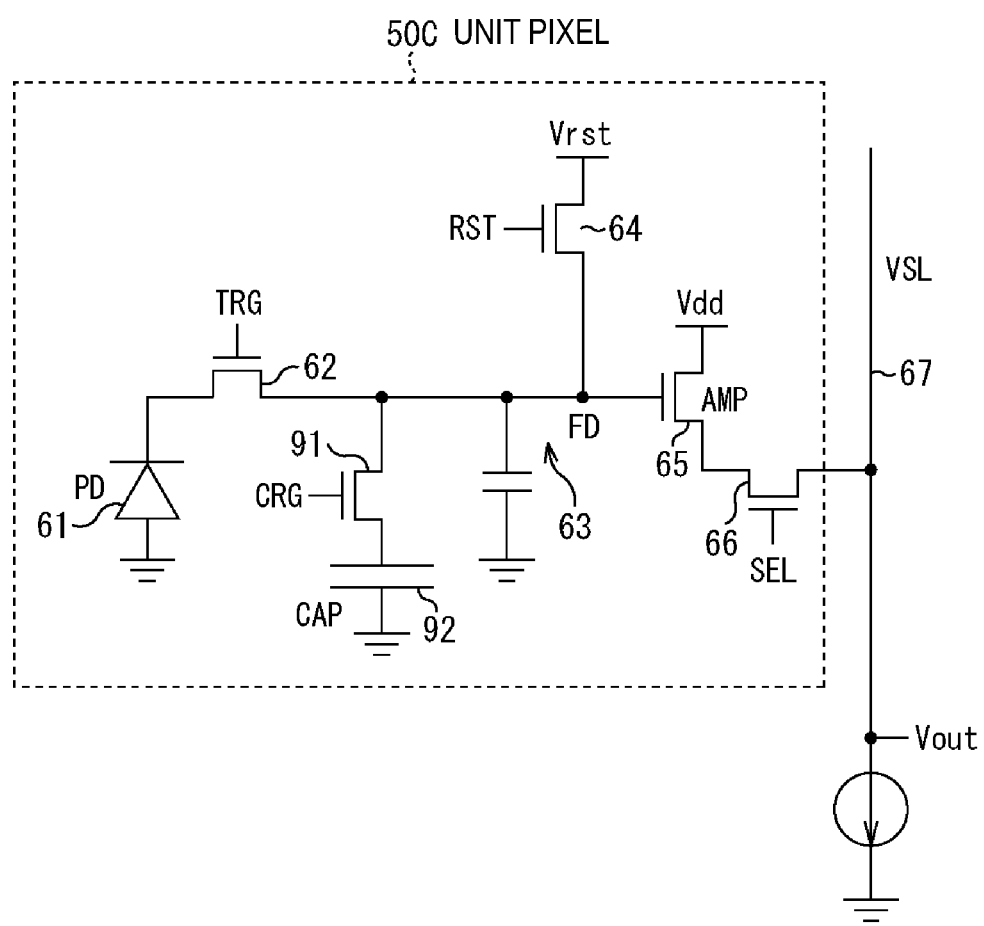
FIG. 8 is a diagram illustrating still another unit-pixel-configuration example.

FIG. 8 is a diagram illustrating still another circuit configuration example of the unit pixel 50.

In addition to the configuration in FIG. 5, a unit pixel 50C in FIG. 8 includes a transfer gate 91 and a capacitive element (CAP) 92 which are provided between the transfer gate 62 and the floating diffusion 63.

When a drive signal CRG is applied to a gate electrode of the transfer gate 91, the transfer gate 91 transfers, to the capacitive element 92, charges transferred from the photo diode 61 through the transfer gate 62. The capacitive element 92 accumulates therein the charges transferred by the transfer gate 91 from the photo diode 61 through the transfer gate 62.

Note that when a drive signal TRG is applied to the gate electrode of the transfer gate 62, the transfer gate 62 transfers the charges accumulated in the photo diode 61 not only the floating diffusion 63 but also to the capacitive element 92 through the transfer gate 91.

In other words, in the unit pixel 50C in FIG. 8, one or both of the floating diffusion 63 and the capacitive element 92 serve as the charge holding sections. When only the floating diffusion 63 serves as the charge holding section, the charge holding section initialization operation is thereby performed by applying a drive signal RST in the pulsed manner. When only the capacitive element 92 serves as the charge holding section, or when each of the floating diffusion 63 and the capacitive element 92 serves as the charge holding section, the charge holding section initialization operation is performed by applying the corresponding drive signal RST or CRG in the pulsed manner.

[Yet Another Circuit Configuration Example of Unit Pixel]

Figure 9:
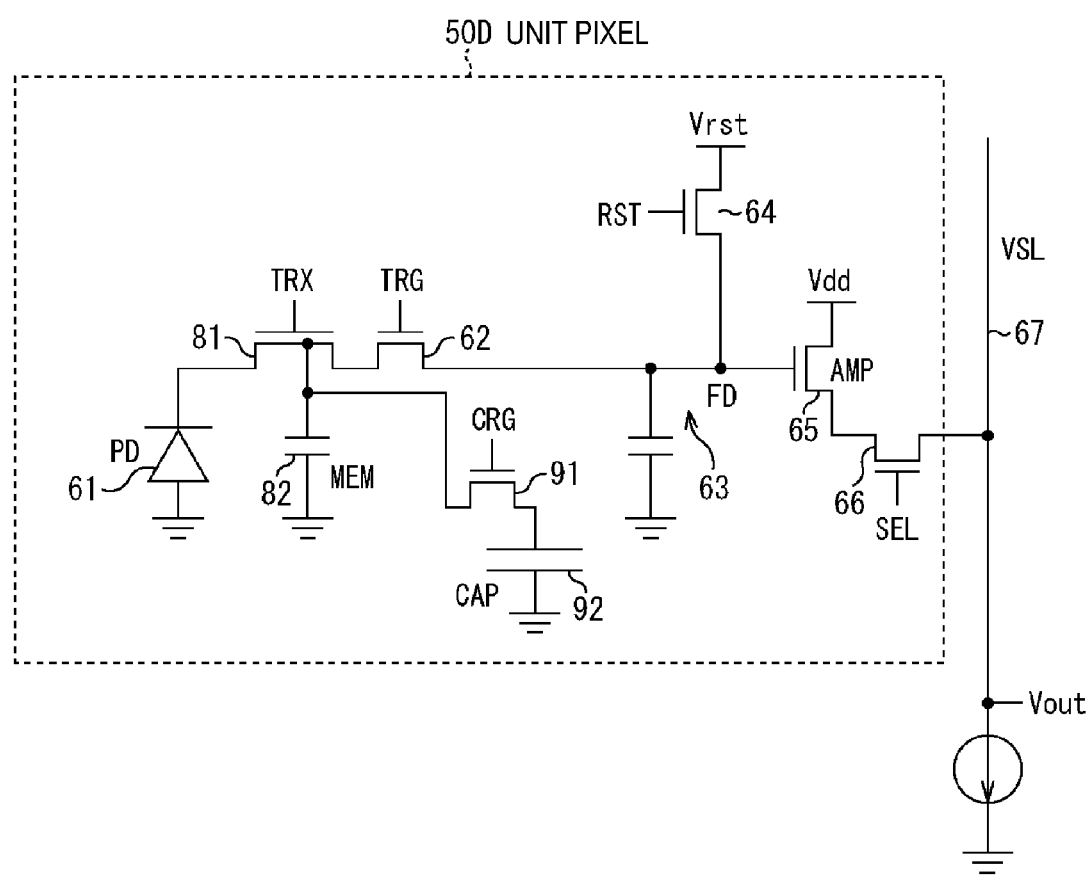
FIG. 9 is a diagram illustrating yet another unit-pixel-configuration example.

FIG. 9 is a diagram illustrating yet another circuit configuration example of the unit pixel 50.

In addition to the configuration in FIG. 5, a unit pixel 50D in FIG. 9 includes: the transfer gate 81 and the memory section (MEM) 82 which are provided between the photo diode 61 and the transfer gate 62; and the transfer gate 91 and the capacitive element (CAP) 92 which are provided between the transfer gate 62 and the floating diffusion 63.

Note that in FIG. 9, the transfer gate 81 and the memory section 82 are the same as the transfer gate 81 and the memory section 82 in FIG. 7, respectively, and the transfer gate 91 and the capacitive element 92 are the same as the transfer gate 91 and the capacitive element 92 in FIG. 8, respectively. Accordingly, explanation thereof is omitted.

However, when a drive signal CRG is applied to the gate electrode of the transfer gate 91, the transfer gate 91 transfers, to the capacitive element 92, charges transferred from the photo diode 61 through the transfer gate 81. The capacitive element 92 accumulates therein the charges transferred by the transfer gate 91 from the photo diode 61 through the transfer gate 81.

In other words, in the unit pixel 50D in FIG. 9, the floating diffusion 63 and one or both of the memory section 82 and the capacitive element 92 serve as the charge holding sections. When the floating diffusion 63 and the memory section 82 serve as the charge holding sections, charge holding section initialization operations are performed by applying a drive signal RST and a drive signal TRG in the pulsed manner. When each of the floating diffusion 63 and the capacitive element 92 serves as the charge holding section, or when each of the floating diffusion 63, the memory section 82, and the capacitive element 92 serves as the charge holding section, the charge holding section initialization operation is performed by applying the corresponding drive signal RST, TRG, or CRG in the pulsed manner.

Meanwhile, in each unit pixel described above, the charge holding section initialization operation is performed after charge discharging and before charge transfer, but may be performed before the charge discharging by newly providing a charge discharger for discharging the charges accumulated in the photo diode 61.

[Further Another Circuit Configuration Example of Unit Pixel]

Figure 10:
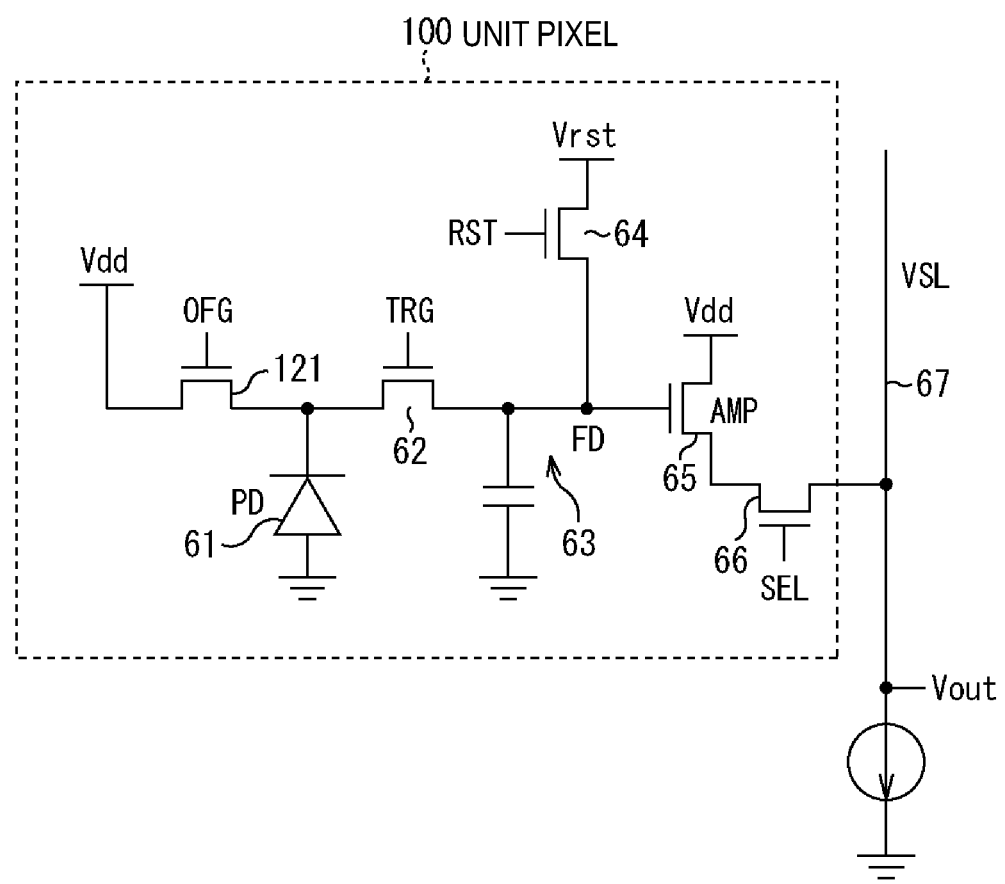
FIG. 10 is a diagram illustrating further another unit-pixel-configuration example.

FIG. 10 is a diagram illustrating a circuit configuration example of a unit pixel where the charge holding section initialization operation is performed before charge discharging.

Note that elements in FIG. 10 corresponding to those in FIG. 5 are denoted with the same reference numerals, and repeated explanation thereof is appropriately omitted.

In addition to the configuration of the unit pixel 50 illustrated in FIG. 5, a unit pixel 100 illustrated in FIG. 10 further includes an overflow gate 121 configured of a transistor or the like. In FIG. 10, the overflow gate 121 is connected to a portion between the power supply Vdd and the photo diode 61. When supplied with a drive signal OFG from the vertical drive section 42 through the corresponding pixel drive line 46, the overflow gate 121 resets the photo diode 61. In other words, the overflow gate 121 discharges charges accumulated in the photo diode 61.

In this way, the unit pixel 100 is driven in accordance with the drive signals TRG, RST, SEL, and OFG which are supplied by the vertical drive section 42.

[Driving Example of Unit Pixel]

Figure 11:
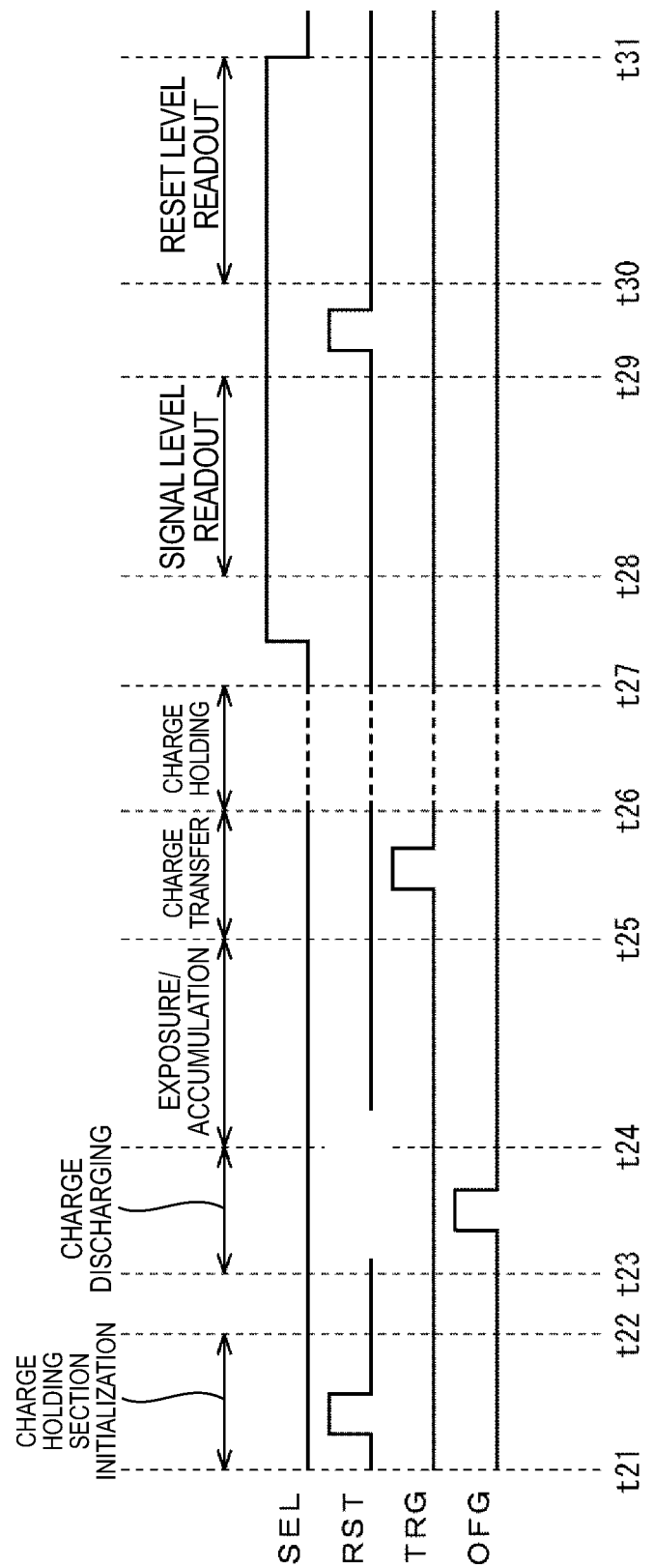
FIG. 11 is a diagram illustrating a unit-pixel-driving example.

Next, an example of driving the unit pixel 100 will be described with reference to a timing chart in FIG. 11.

Firstly, during a period from time t21 to time t22, charges accumulated in the floating diffusion 63 are initialized (reset) by applying a drive signal RST in the pulsed manner.

Next, during a period from time t23 to time t24, a drive signal OFG is applied in the pulsed manner, and charges accumulated in the photo diode 61 are discharged.

In this way, the charges accumulated in the photo diode 61 so far are swept out, and charges newly obtained from light from the subject are accumulated in the photo diode 61 during a period from time t24 to time t25.

Figure 6:
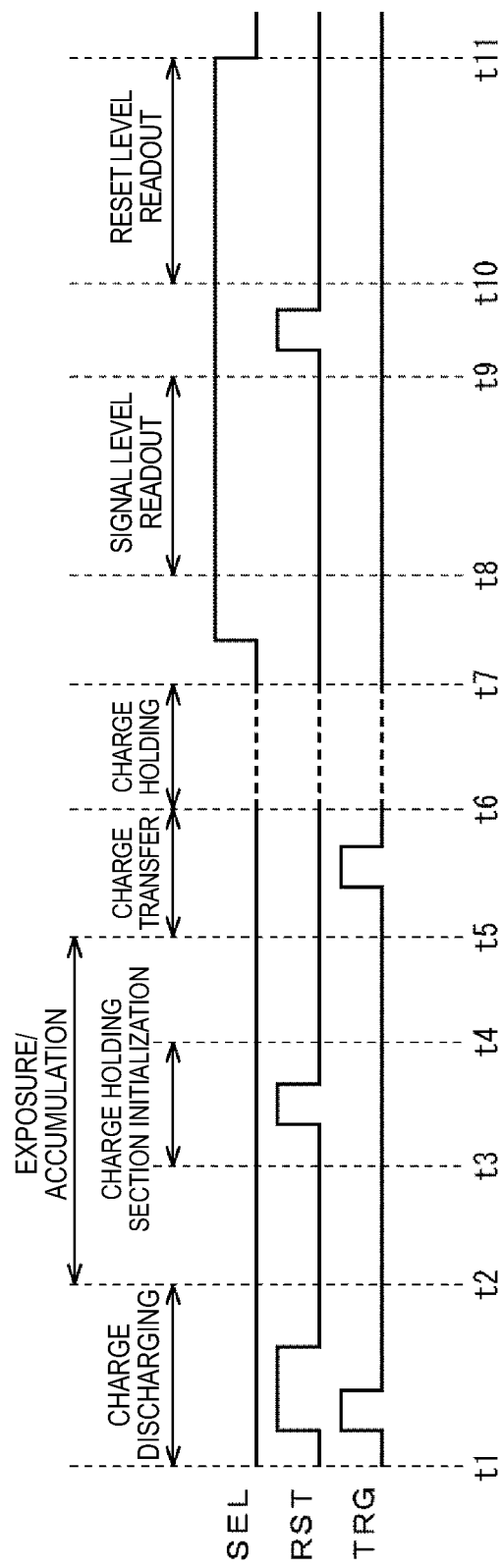
FIG. 6 is a diagram illustrating a unit-pixel-driving example.

Note that since operations during a period from time t25 to time t31 are the same as the operations during a period from time t5 to time t11 in FIG. 6, explanation thereof is omitted.

By providing the overflow gate 121 discharging the charges in the photo diode 61 in the unit pixel 100 as described above, the charge holding section initialization operation is performed before charge discharging.

The configuration of the unit pixel operating as described above may be employed for configurations other than the configuration of the unit pixel illustrated in FIG. 10. Hereinbelow, descriptions are given of the other configurations of unit pixels to which the present technology is applicable. In the following drawings, elements corresponding to those in FIG. 10 are denoted with the same reference numerals, and repeated explanation thereof is appropriately omitted.

[Another Circuit Configuration Example of Unit Pixel]

Figure 12:
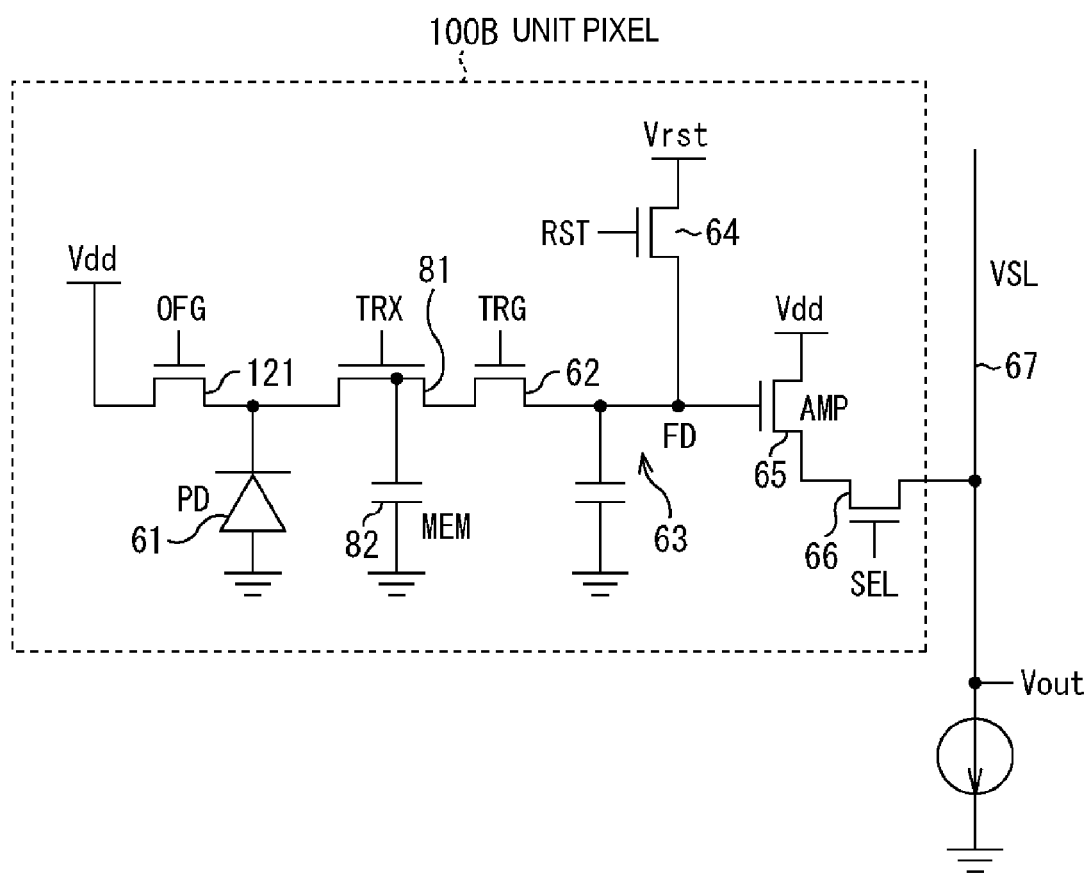
FIG. 12 is a diagram illustrating still another unit-pixel-configuration example.

FIG. 12 is a diagram illustrating another circuit configuration example of the unit pixel 100.

Figure 16:
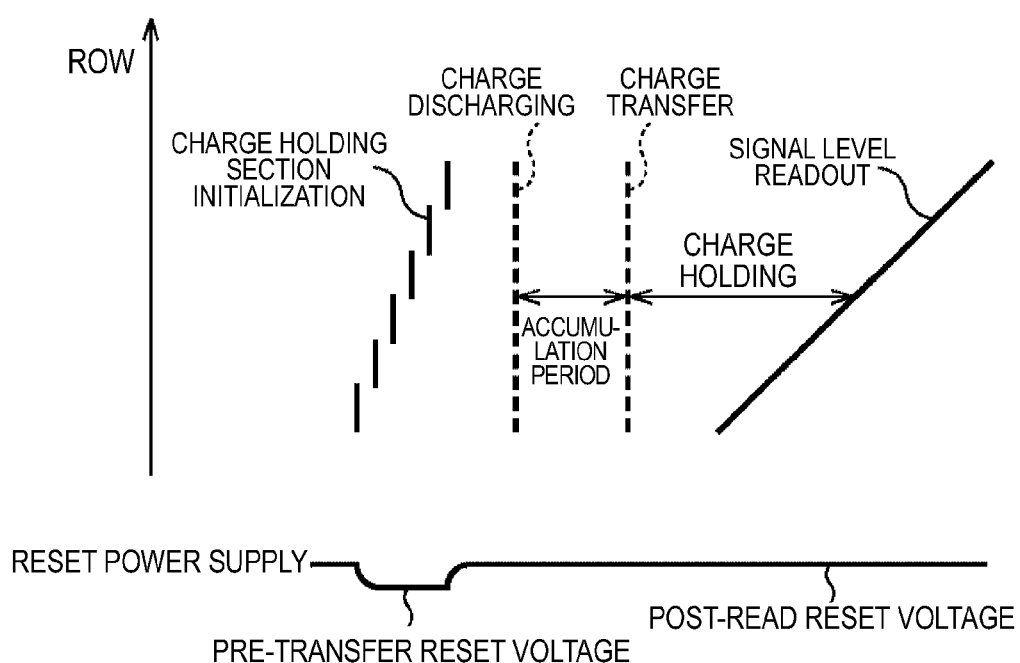
FIG. 16 is a diagram illustrating another example of driving a solid-state imaging device in related art.

In addition to the configuration in FIG. 10, a unit pixel 100B in FIG. 12 includes the transfer gate 81 and the memory section (MEM) 82 which are provided between the photo diode 61 and the transfer gate 62. Note that since the transfer gate 81 and the memory section 82 in FIG. 16 are the same as the transfer gate 81 and the memory section 82 in FIG. 7, explanation thereof is omitted.

In other words, the unit pixel 100B in FIG. 12, the floating diffusion 63 and the memory section 82 serve as the charge holding sections, and the charge holding section initialization operations are performed by applying drive signals RST and TRG in the pulsed manner.

[Still Another Circuit Configuration Example of Unit Pixel]

Figure 13:
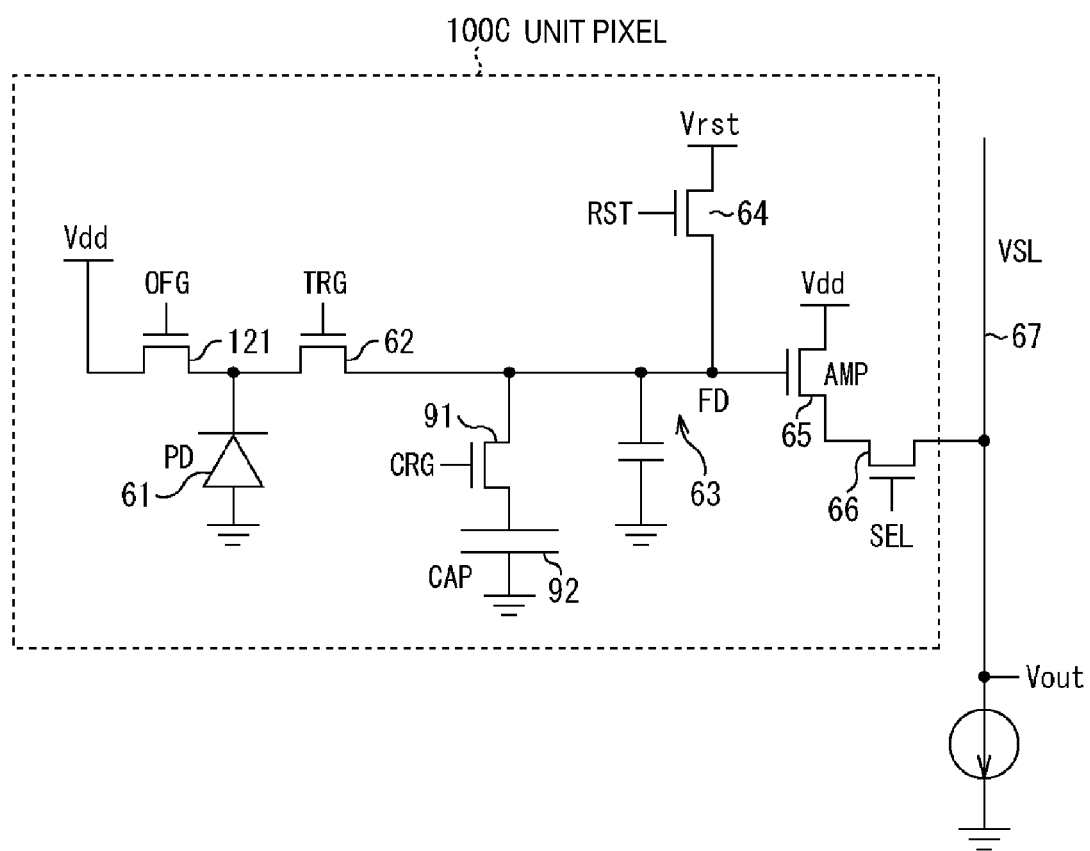
FIG. 13 is a diagram illustrating yet another unit-pixel-configuration example.

FIG. 13 is a diagram illustrating still another circuit configuration example of the unit pixel 100.

In addition to the configuration in FIG. 10, a unit pixel 100C in FIG. 13 includes the transfer gate 91 and the capacitive element (CAP) 92 which are provided between the transfer gate 62 and the floating diffusion 63. Note that since the transfer gate 91 and the capacitive element 92 in FIG. 13 are the same as the transfer gate 91 and the capacitive element 92 in FIG. 8, explanation thereof is omitted.

In other words, in the unit pixel 100C in FIG. 13, one or both of the floating diffusion 63 and the capacitive element 92 serve as the charge holding sections. When only the floating diffusion 63 serves as the charge holding section, the charge holding section initialization operation is thereby performed by applying a drive signal RST in the pulsed manner. When only the capacitive element 92 serves as the charge holding section, or when each of the floating diffusion 63 and the capacitive element 92 serves as the charge holding section, the charge holding section operation is performed by applying the corresponding drive signal RST or CRG in the pulsed manner.

[Yet Another Circuit Configuration Example of Unit Pixel]

Figure 14:
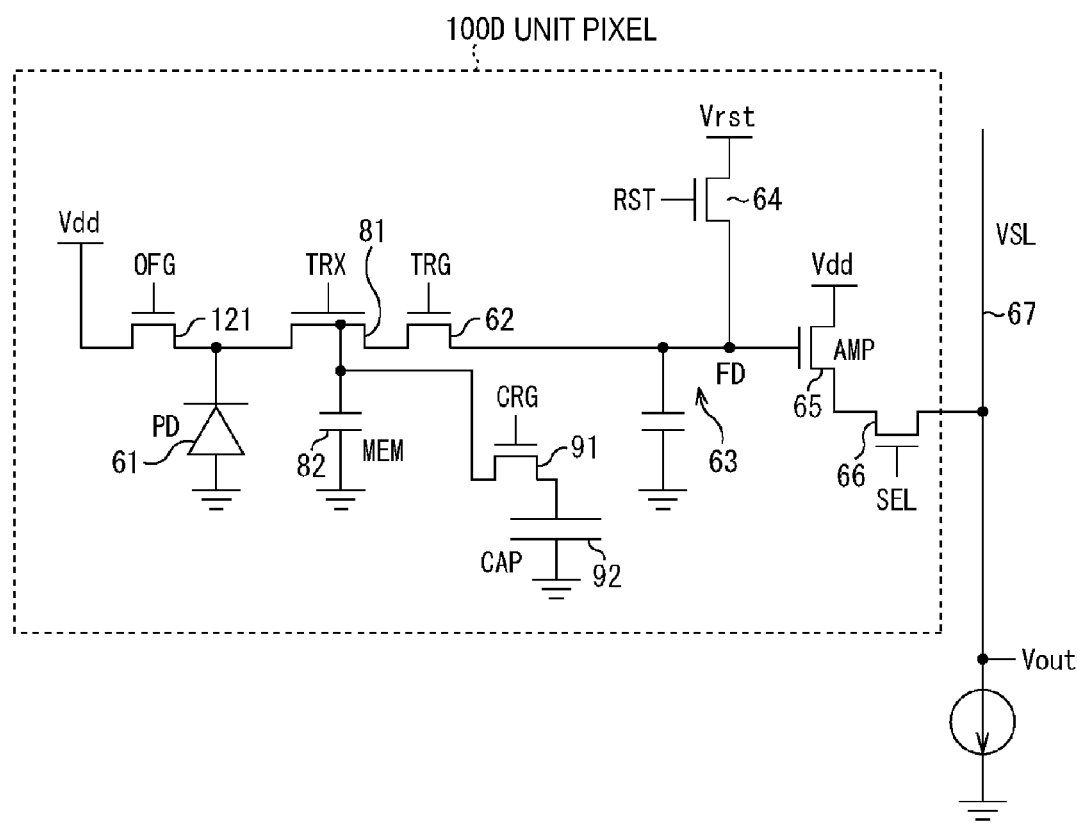
FIG. 14 is a diagram illustrating further another unit-pixel-configuration example.

FIG. 14 is a diagram illustrating yet another circuit configuration example of the unit pixel 100.

In addition to the configuration in FIG. 10, a unit pixel 100D in FIG. 14 includes: the transfer gate 81 and the memory section (MEM) 82 which are provided between the photo diode 61 and the transfer gate 62; and the transfer gate 91 and the capacitive element (CAP) 92 which are provided between the transfer gate 62 and the floating diffusion 63. Note that the transfer gate 81, the memory section 82, the transfer gate 91, and the capacitive element 92 in FIG. 14 have the same functions as those of the transfer gate 81, the memory section 82, the transfer gate 91, and the capacitive element 92 in FIG. 9, respectively, and thus explanation thereof is omitted.

In other words, in the unit pixel 100D in FIG. 14, the floating diffusion 63 and one or both of the memory section 82 and the capacitive element 92 serve as the charge holding sections. When the floating diffusion 63 and the memory section 82 serve as the charge holding sections, the charge holding section initialization operations are performed by applying drive signals RST and TRG in the pulsed manner. When each of the floating diffusion 63 and the capacitive element 92 serves as the charge holding section, or when each of the floating diffusion 63, the memory section 82, and the capacitive element 92 serves as the charge holding section, the charge holding section initialization operation is performed by applying the corresponding drive signal RST, TRG, or CRG in the pulsed manner.

In the aforementioned description, the charge holding section initialization operation is performed before charge discharging in the unit pixel including the overflow gate 121, as described with reference to FIG. 11. However, as described with reference to FIG. 6, the charge holding section initialization operation may be performed after charge discharging and before charge transfer, with the overflow gate 121 prevented from being driven.

[Driving Example of Solid-State Imaging Device in Related Art]

Here, an example of driving the solid-state imaging device in the related art will be described in more detail.

Figure 2:
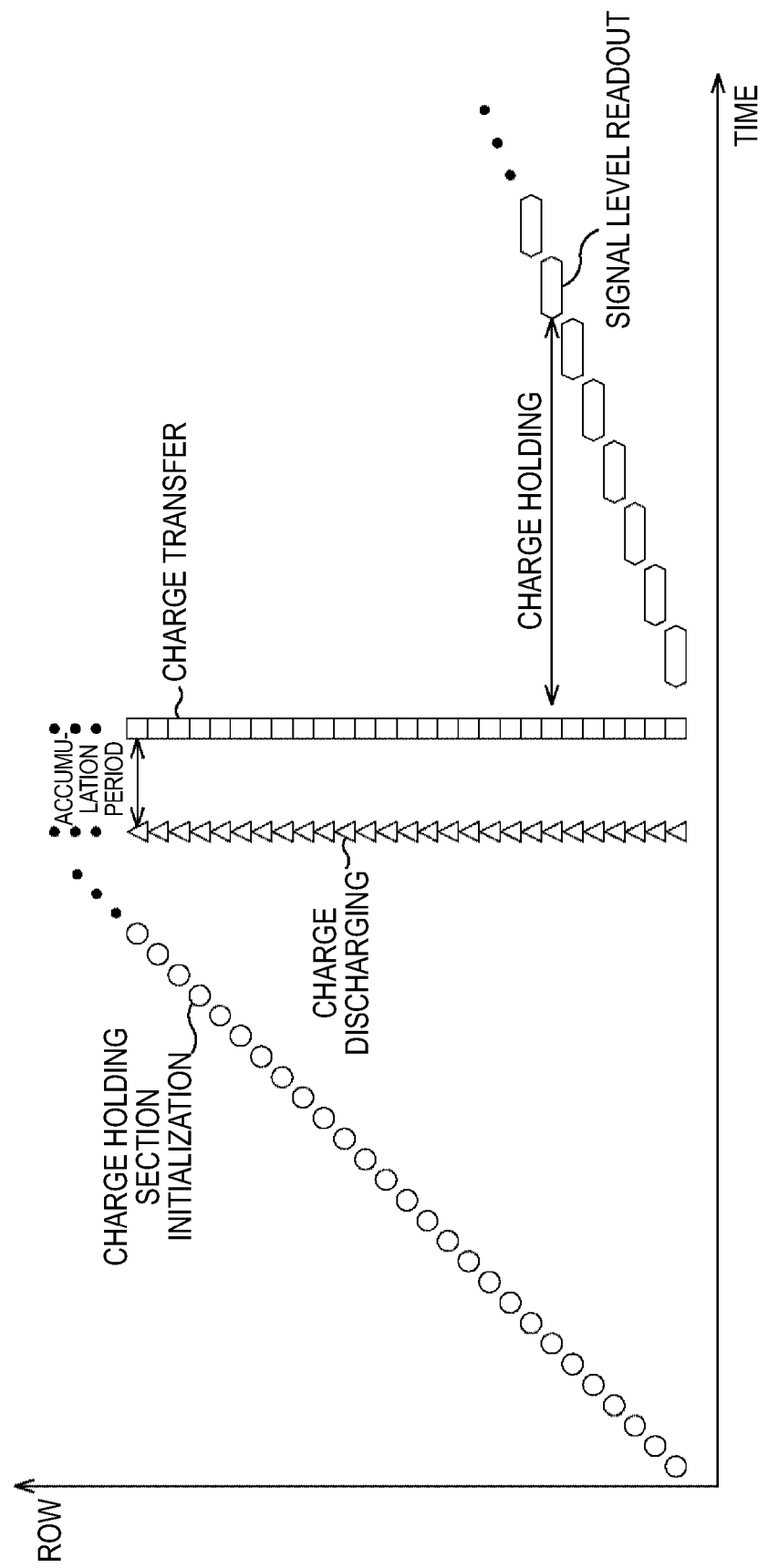
FIG. 2 is a diagram illustrating operation of a solid-state imaging device in related art.
Figure 15:
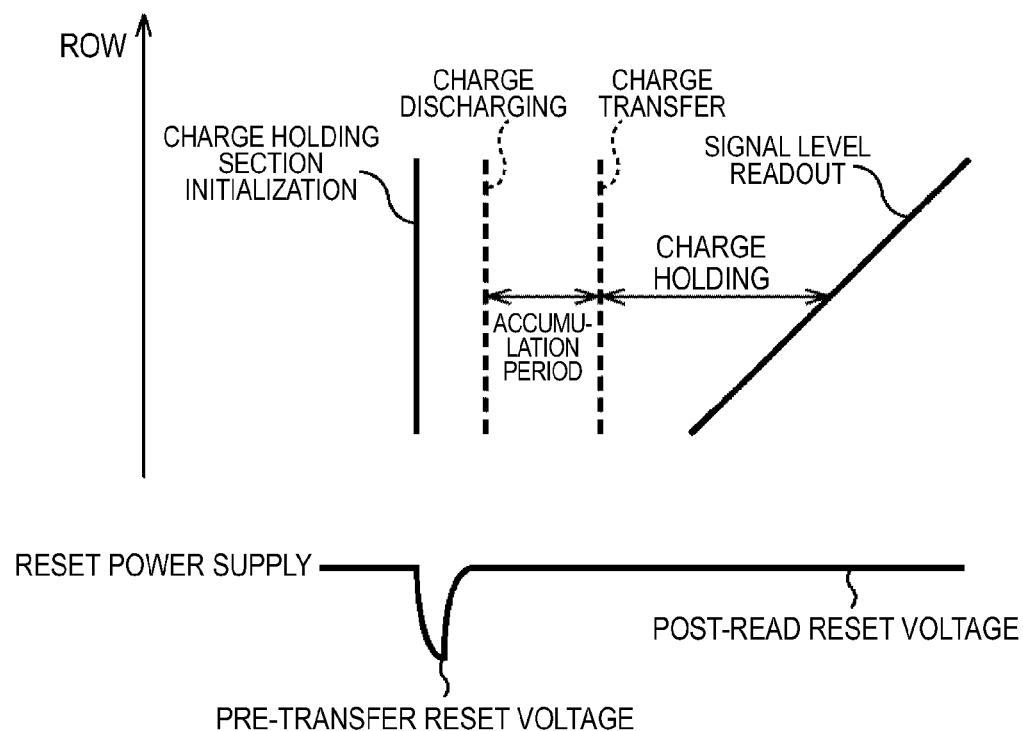
FIG. 15 is a diagram illustrating an example of driving a solid-state imaging device in related art.

FIG. 15 illustrates: an example of driving the solid-state imaging device where the charge holding section initialization before charge transfer is performed in a batch of all pixels as described with reference to FIG. 1; and a pre-transfer reset voltage and a post-readout reset voltage (hereinafter, also referred to as a reset power supply voltage) in the solid-state imaging device. Note that FIGS. 1 to 3 illustrate, in row units, driving of the charge holding section initialization, the charge discharging, the charge transfer, and the signal level readout by using the circles, the triangles, the rectangles, and the oblong hexagons, respectively, but FIG. 15 illustrates the driving in a simplified manner. This holds true for the figures subsequent to FIG. 15.

As described above, when the charge holding section initialization before charge transfer is performed in a batch of all pixels, there is a large difference between the pre-transfer reset voltage and the post-readout reset voltage, as illustrated in FIG. 15, due to a voltage drop in the power for a reset transistor designed to initialize the charge holding section and due to cross talk between the reset signal line for supplying the reset voltage to the pixels of each adjacent row and the charge holding section.

Hence, as described with reference to FIG. 3, the applicant charge holding section has made it possible to reduce the difference between the pre-transfer reset voltage and the post-readout reset voltage by serially performing the charge holding section initialization before charge transfer in units of rows not adjacent to one another.

Although the charge holding section initialization before charge transfer is preferably performed at high speed to prevent frame rate deterioration, for example, in units of a plurality of rows, the number of rows from which reset voltages are read out in reading out signals depends on the architecture, and is typically one or two.

As described above, the number of rows on which the charge holding section initialization before charge transfer is performed is different from the number of rows from which reset voltages are read out in reading out signals. For this reason, there is a difference between the pre-transfer reset voltage and the post-readout reset voltage accordingly, as illustrated in FIG. 16. Thus, it is not possible to completely prevent the offset noise occurrence, and this hinders a higher image quality of a captured image.

Hence, a description is given below of an embodiment of a solid-state imaging device designed to more reliably reduce the difference between the pre-transfer reset voltage and the post-readout reset voltage.

2. First Embodiment of Present Technology

The CMOS image sensor 30 in FIG. 4 is applied to the solid-state imaging device in a first embodiment of the present technology. However, the details thereof have been described with reference to FIG. 4, and thus are omitted here. Note that the system control section 45 herein controls the voltage readout from the charge holding section in accordance with the charge holding section initialization performed by the reset transistor 64 before charge transfer performed by the transfer gate 62.

Specifically, when the number of rows (hereinafter, referred to as initialization rows) on which the charge holding section initialization is simultaneously performed before the charge transfer performed by the transfer gate 62 in the pixel array section 41 is larger than the number of rows (hereinafter, referred to as readout rows) on which charge holding section voltages are simultaneously read out, the system control section 45 causes the reset transistor 64 to perform charge resetting on the at least one readout row and the other rows (hereinafter, referred to as non-readout rows), the charge resetting being performed when the charge holding section voltages are read out.

[Driving Example of Unit Pixel]

Figure 17:
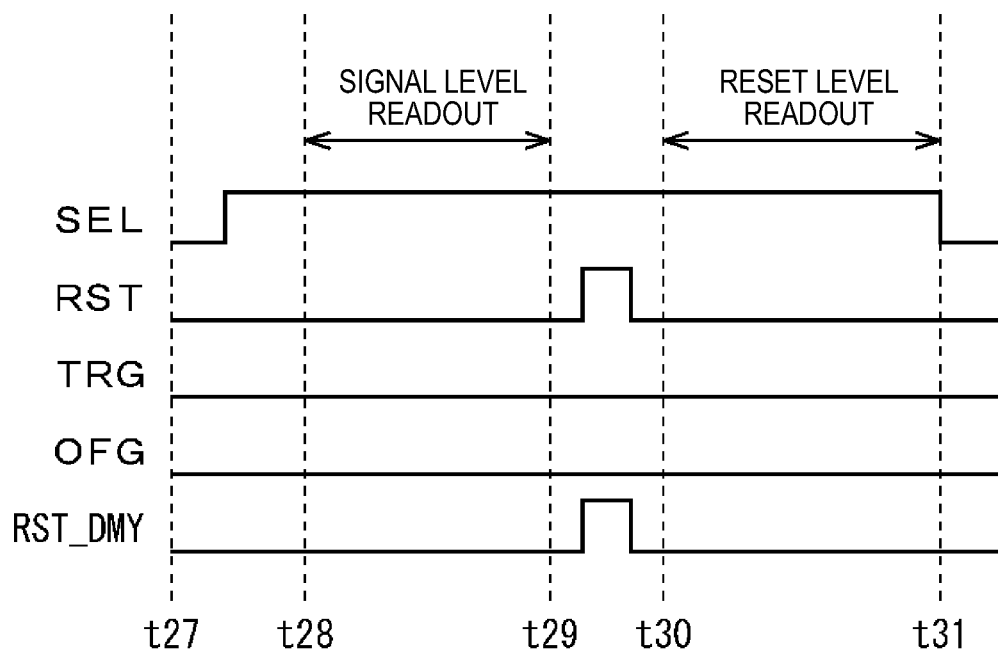
FIG. 17 is a diagram illustrating an example of driving a unit pixel to which the embodiments of the present technology are applied.

Next, with reference to a timing chart in FIG. 17, a description is given of an example of driving the unit pixel included in the CMOS image sensor 30 which is the solid-state imaging device according to the present embodiment.

Note that the unit pixel 100 in FIG. 10 is applied to the unit pixel in the present embodiment, but any of the unit pixels 100B, 100C, and 100D in respective FIGS. 12 to 14 may be applied thereto.

That is, the unit pixel 100 in the present embodiment operates in the same manner as described with reference to the timing chart in FIG. 11. However, in the CMOS image sensor 30 in the present embodiment, during a period from time t29 to time t30 as illustrated in FIG. 17, a drive signal RST for each unit pixel included in the readout row is set at the H level, and a drive signal RST_DMY for each unit pixel included in the non-readout rows is set at the H level.

[Driving Example of Solid-State Imaging Device]

Figure 18:
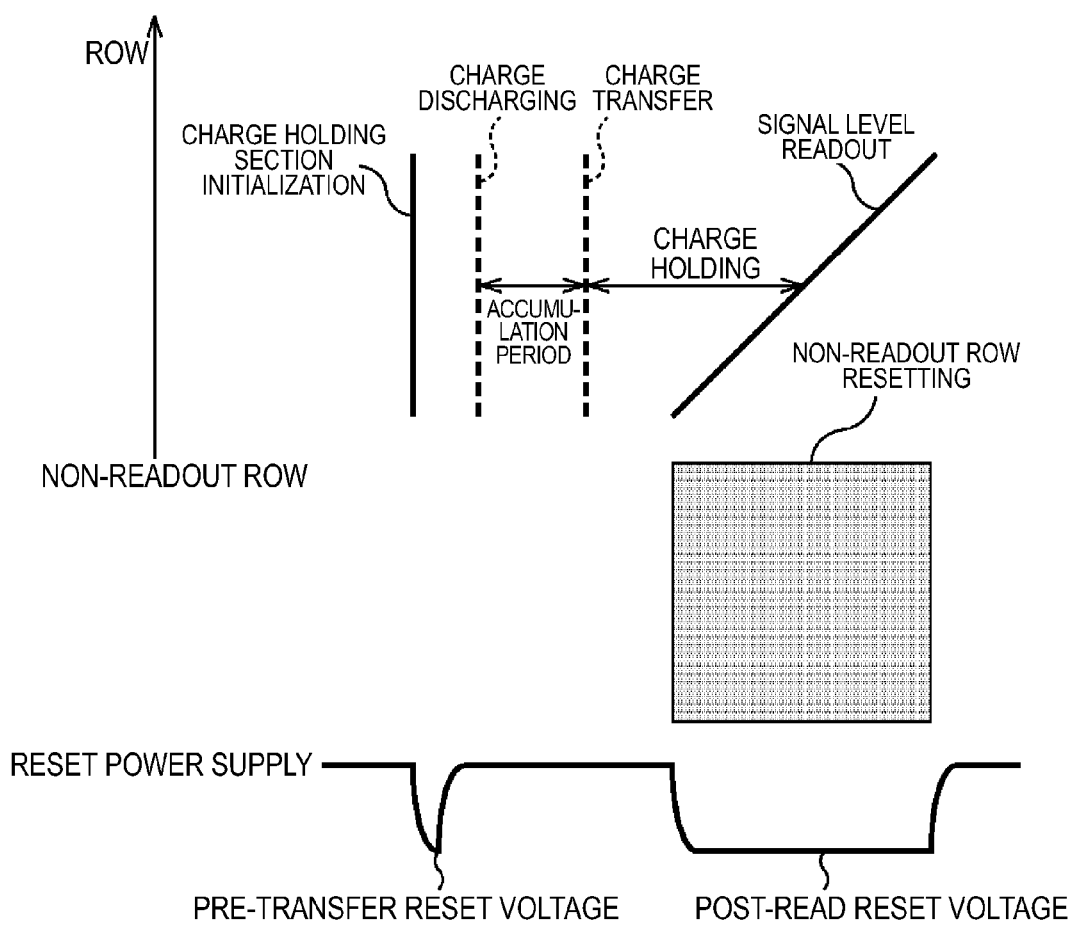
FIG. 18 is a diagram illustrating an example of driving a solid-state imaging device according to a first embodiment of the present technology.

Next, with reference to FIG. 18, a description is given of an example of driving each unit pixel 100 in row units in the CMOS image sensor 30 which is the solid-state imaging device in the present embodiment.

FIG. 18 illustrates an example of driving the CMOS image sensor 30 performing the global shutter operation in which charge discharging and charge transfer are performed in a batch of all pixels as in FIG. 15. Note that as illustrated in FIG. 18, the charge holding section initialization operation before charge transfer is performed in a batch of all pixels before the charge discharging.

In addition, in the operation illustrated in FIG. 18, as described with reference to FIG. 17, the non-readout rows are reset when signal levels and reset levels are read out in row units. Specifically, the readout row and the non-readout rows are simultaneously reset so that the sum of the number of the readout rows and the number of the non-readout rows can be almost equal to the number of the charge holding section initialization rows (i.e., the number of all rows).

Here, a description is given of the non-readout rows in the pixel array section 41.

As illustrated in FIG. 18, charges transferred due to the charge transfer are held in the charge holding section until a readout row is selected. In other words, unit pixels (to be read out) included in the readout row have charges in the charge holding sections thereof, and thus it is not possible that the unit pixels are pixels in the non-readout rows where the charge holding sections are reset simultaneously with the readout row. Accordingly, it is necessary that the non-readout rows should be formed by pixels from which the charge holding section voltages are not read out.

Figure 19:
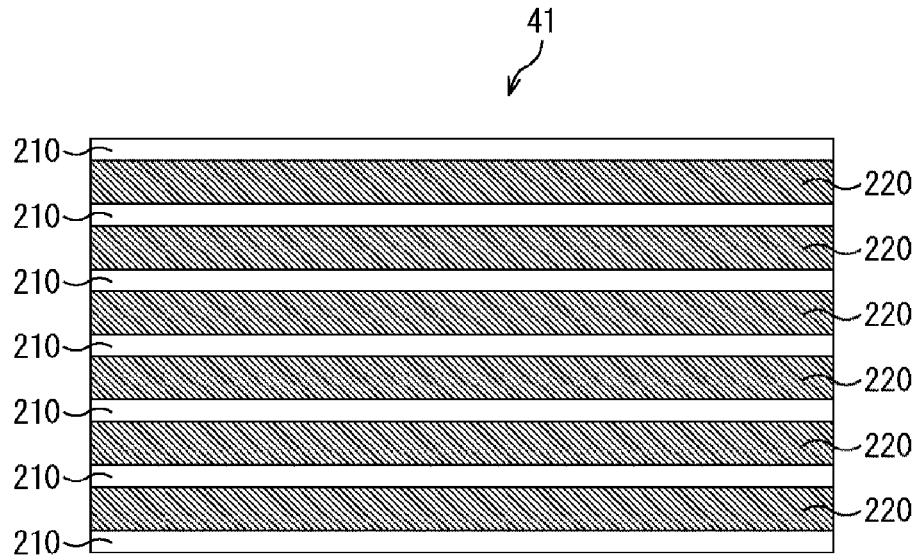
FIG. 19 is a diagram illustrating an example of non-readout rows.

Specifically, when pixels the number of which is reduced are driven in the pixel array section 41, omitted rows 220 each present between readout rows 210 where readout is performed may be the non-readout rows, as illustrated in FIG. 19, for example.

In addition, the non-readout row may be a row formed by: dummy pixels for intensity correction provided outside an effective pixel region in the pixel array section 41; or pixels which are not used for signal output among pixels in an OPB (Optical Black) region.

The non-readout rows formed in this way are reset at the same time when the readout rows are reset.

According to the operation above, the readout rows and the non-readout rows are simultaneously reset when the charge holding section voltages are read out. Accordingly, it is possible to make the number of rows subjected to the charge holding section initialization before charge transfer equal to the number of rows reset at signal readout, and to have the same voltage drop in the pre-transfer reset voltage and the post-readout reset voltage, as illustrated in FIG. 18. Thus, it is possible to more reliably prevent occurrence of offset noise and thus to achieve a higher image quality of a captured image.

Note that in the example of driving the CMOS image sensor 30 performing the global shutter operation as described with reference to FIG. 18, the charge holding section initialization operation before charge transfer is performed in a batch of all pixels before charge discharging, but may be performed serially in units of a plurality of rows not adjacent to one another before charge discharging.

[Another Driving Example of Solid-State Imaging Device]

Figure 20:
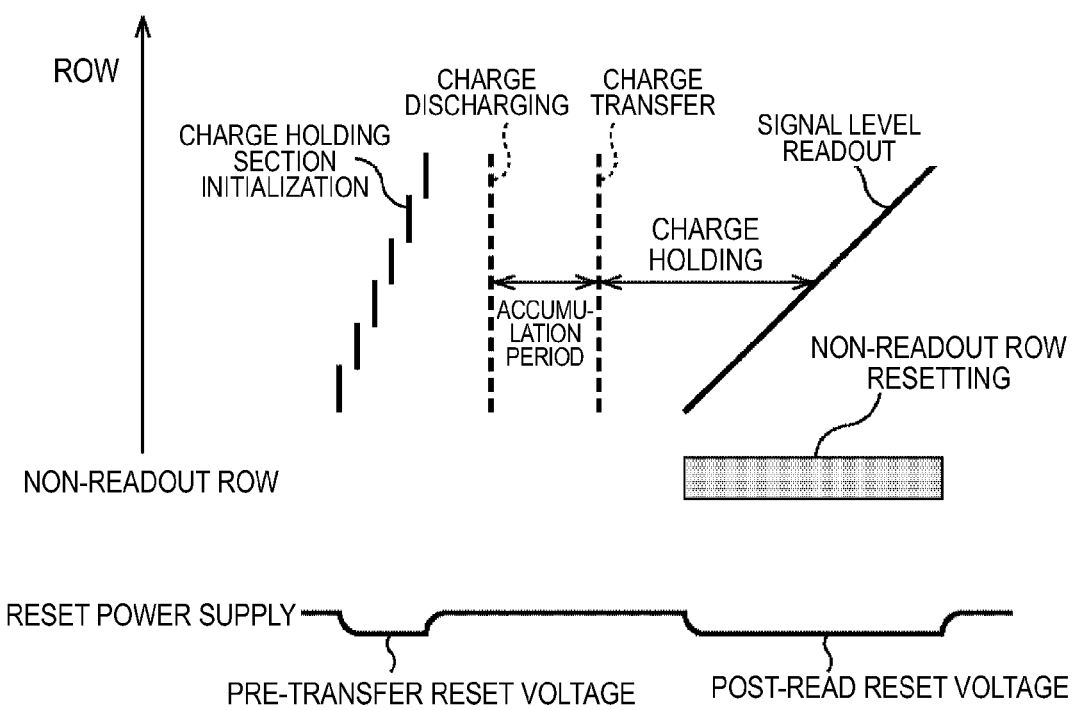
FIG. 20 is a diagram illustrating another example of driving the solid-state imaging device according to the first embodiment of the present technology.

FIG. 20 is a diagram illustrating another example of driving each unit pixel 100 in row units in the CMOS image sensor 30 which is the solid-state imaging device in the present embodiment.

Like FIG. 18, FIG. 20 illustrates an example of driving the CMOS image sensor 30 performing the global shutter operation in which charge discharging and charge transfer are performed in batch of all pixels. However, the charge holding section initialization operation before charge transfer is serially performed in units of a plurality of rows not adjacent to one another before the charge discharging.

In addition, in the operation illustrated in FIG. 20, the non-readout rows are reset when signal levels and reset levels are read out in row units. Specifically, the readout row and the non-readout rows are simultaneously reset so that the sum of the number of the readout rows and the number of the non-readout rows can be almost equal to the number of the charge holding section initialization rows (i.e., the plurality of rows not adjacent to one another).

According to the operation above, it is possible to make the number of rows subjected to the charge holding section initialization before charge transfer equal to the number of rows reset at signal readout, and to have the same voltage drop in the pre-transfer reset voltage and the post-readout reset voltage, as illustrated in FIG. 20. Thus, it is possible to more reliably prevent occurrence of offset noise and thus to achieve a higher image quality of a captured image.

In the description above, the charge holding section initialization operation before charge transfer is performed before charge discharging with reference to the example of driving the unit pixels 100 or the like (FIG. 11), but may be performed after charge discharging and before charge transfer with reference to the example of driving the unit pixels 50 or the like (FIG. 6).

In other words, any of the unit pixel 50 in FIG. 5 and the unit pixels 50B, 50C, and 50D in FIGS. 7, 8, and 9, respectively, may be applied to the unit pixel in the present embodiment.

[Still Another Driving Example of Solid-State Imaging Device]

Figure 21:
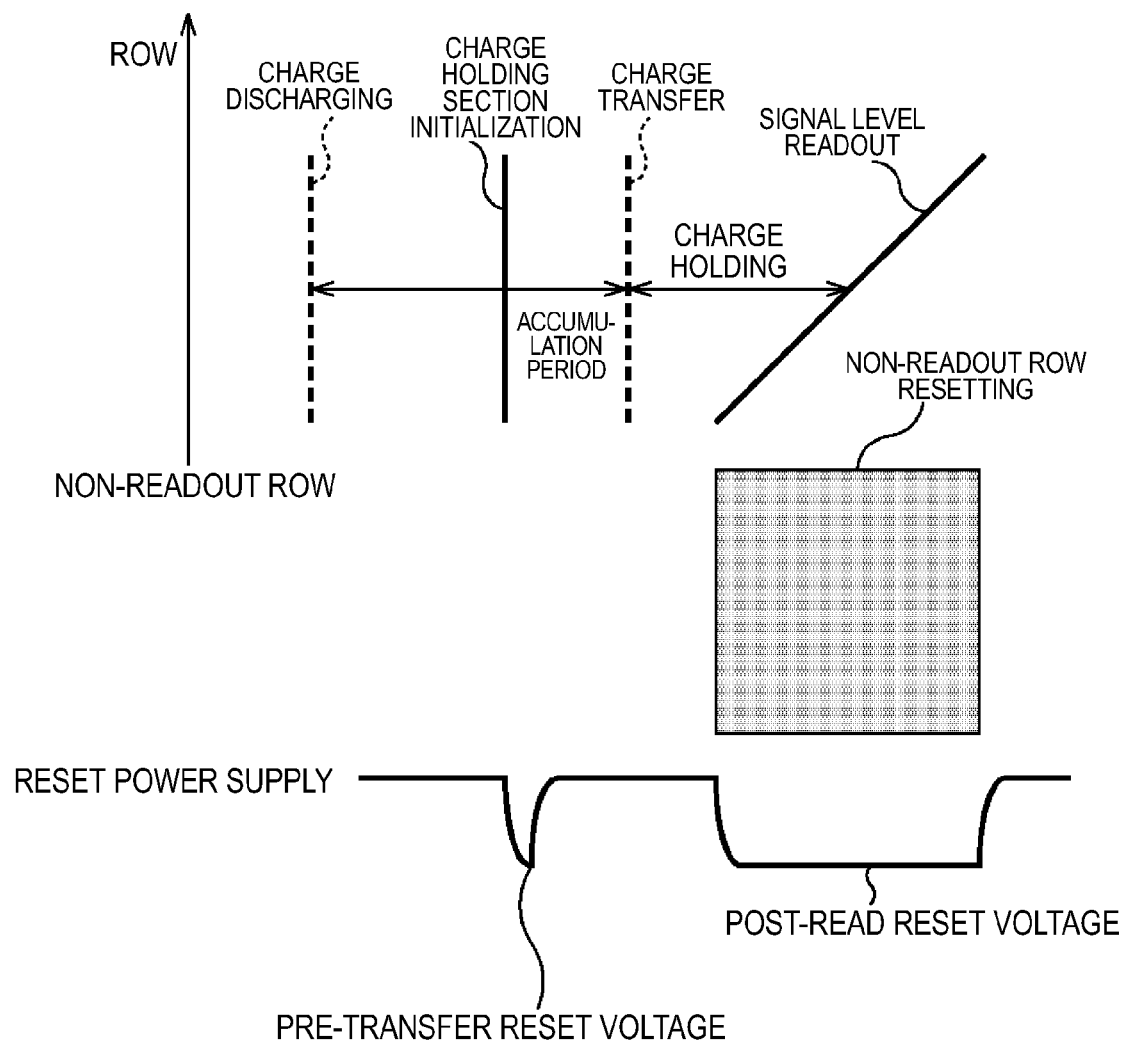
FIG. 21 is a diagram illustrating still another example of driving the solid-state imaging device according to the first embodiment of the present technology.

FIG. 21 is a diagram illustrating another example of driving each unit pixel 50 in row units in the CMOS image sensor 30 which is the solid-state imaging device in the present embodiment.

FIG. 21 illustrates an example of driving the CMOS image sensor 30 performing the global shutter operation in which charge discharging and charge transfer are performed in a batch of all pixels. However, the charge holding section initialization operation before charge transfer is batched for all pixels after charge discharging and before charge transfer.

In addition, in the operation illustrated in FIG. 21, the non-readout rows are reset when signal levels and reset levels are read out in row units. Specifically, the readout row and the non-readout rows are simultaneously reset so that the sum of the number of the readout rows and the number of the non-readout rows can be almost equal to the number of the charge holding section initialization rows (i.e., the number of all rows).

Also according to the operation above, it is possible to make the number of rows subjected to the charge holding section initialization before charge transfer equal to the number of rows reset at signal readout, and to have the same voltage drop in the pre-transfer reset voltage and the post-readout reset voltage, as illustrated in FIG. 21. Thus, it is possible to more reliably prevent occurrence of offset noise and thus to achieve a higher image quality of a captured image.

Note that in the example of driving the CMOS image sensor 30 performing the global shutter operation as described with reference to FIG. 21, the charge holding section initialization operation before charge transfer is performed in a batch of all pixels after charge discharging and before charge transfer, but may be performed serially in units of a plurality of rows not adjacent to one another after charge discharging and before charge transfer.

[Yet Another Driving Example of Solid-State Imaging Device]

Figure 22:
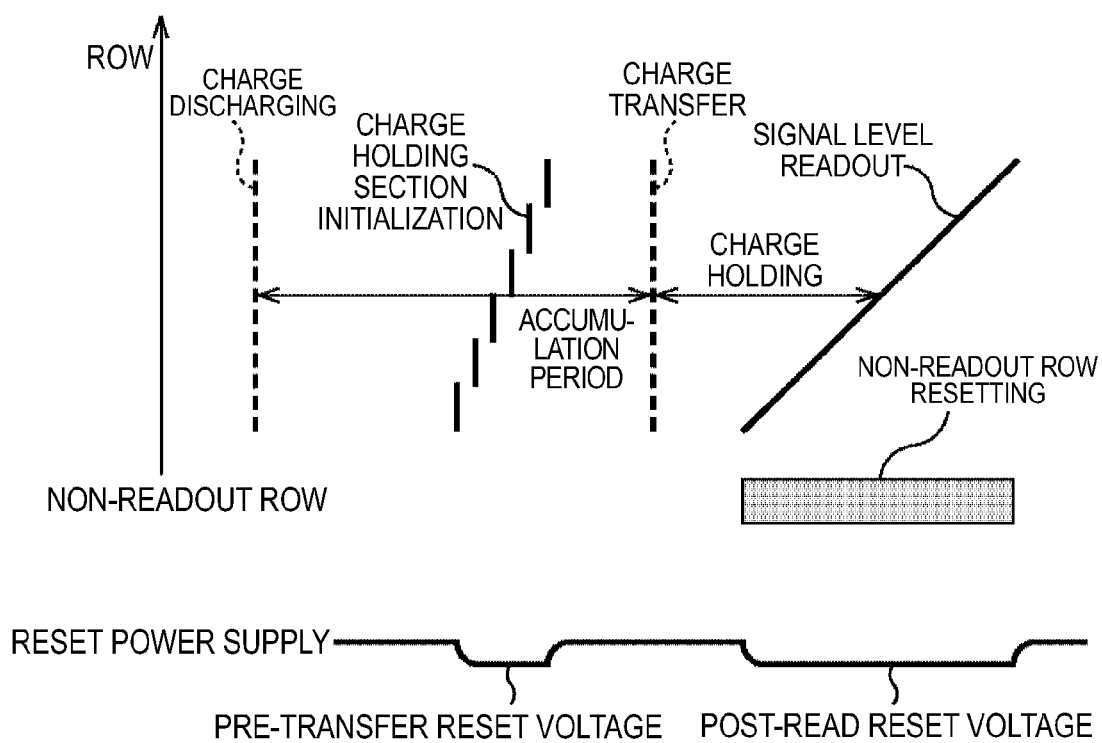
FIG. 22 is a diagram illustrating yet another example of driving the solid-state imaging device according to the first embodiment of the present technology.

FIG. 22 is a diagram illustrating another example of driving each unit pixel 50 in row units in the CMOS image sensor 30 which is the solid-state imaging device in the present embodiment.

FIG. 22 illustrates an example of driving the CMOS image sensor 30 performing the global shutter operation in which charge discharging and charge transfer are performed in a batch of all pixels. The charge holding section initialization operation before charge transfer is serially performed after the charge discharging and before the charge transfer in units of a plurality of rows not adjacent to one another.

In addition, in the operation illustrated in FIG. 22, the non-readout rows are reset when signal levels and reset levels are read out in row units. Specifically, the readout row and the non-readout rows are simultaneously reset so that the sum of the number of the readout rows and the number of the non-readout rows can be almost equal to the number of the charge holding section initialization rows (i.e., the plurality of rows not adjacent to one another).

Also according to the operation above, it is possible to make the number of rows subjected to the charge holding section initialization before charge transfer equal to the number of rows reset at signal readout, and to have the same voltage drop in the pre-transfer reset voltage and the post-readout reset voltage, as illustrated in FIG. 22. Thus, it is possible to more reliably prevent occurrence of offset noise and thus to achieve a higher image quality of a captured image.

In the descriptions given with reference to FIG. 18, and FIGS. 20 to 22, the global shutter operation is performed in which the charge discharging and the charge transfer are performed in a batch of all pixels. However, the charge discharging and the charge transfer may be performed in units of a plurality of rows or one row. Also in such an operation, when the number of initialization rows for the charge holding section initialization is larger than the number of readout rows, the readout row and the non-readout rows are simultaneously reset so that the sum of the number of the readout rows and the number of the non-readout rows can be almost equal to the number of the initialization rows for the charge holding section initialization. Thereby, it is possible to obtain the same operations and advantageous effects as those in the operations described above.

Meanwhile, in the descriptions above, pixels not subjected to readout are used as pixels in the non-readout rows in the pixel array section 41. This case, however, results in restriction on the number of the non-readout rows. Specifically, in the descriptions above, the sum of the number of the readout rows and the number of the non-readout rows is made almost equal to the number of the initialization rows for the charge holding section initialization. However, actually, when the charge holding section initialization operation is performed in a batch of all pixels, all rows in the pixel array section 41 serve as the readout rows, so that it is not possible to prepare the non-readout rows.

Hence, dummy pixels for the non-readout rows may be provided separately from the pixels in the pixel array section 41 and may be used as the pixels for the non-readout rows.

[Dummy Pixels for Non-Readout Rows]

Figure 23:
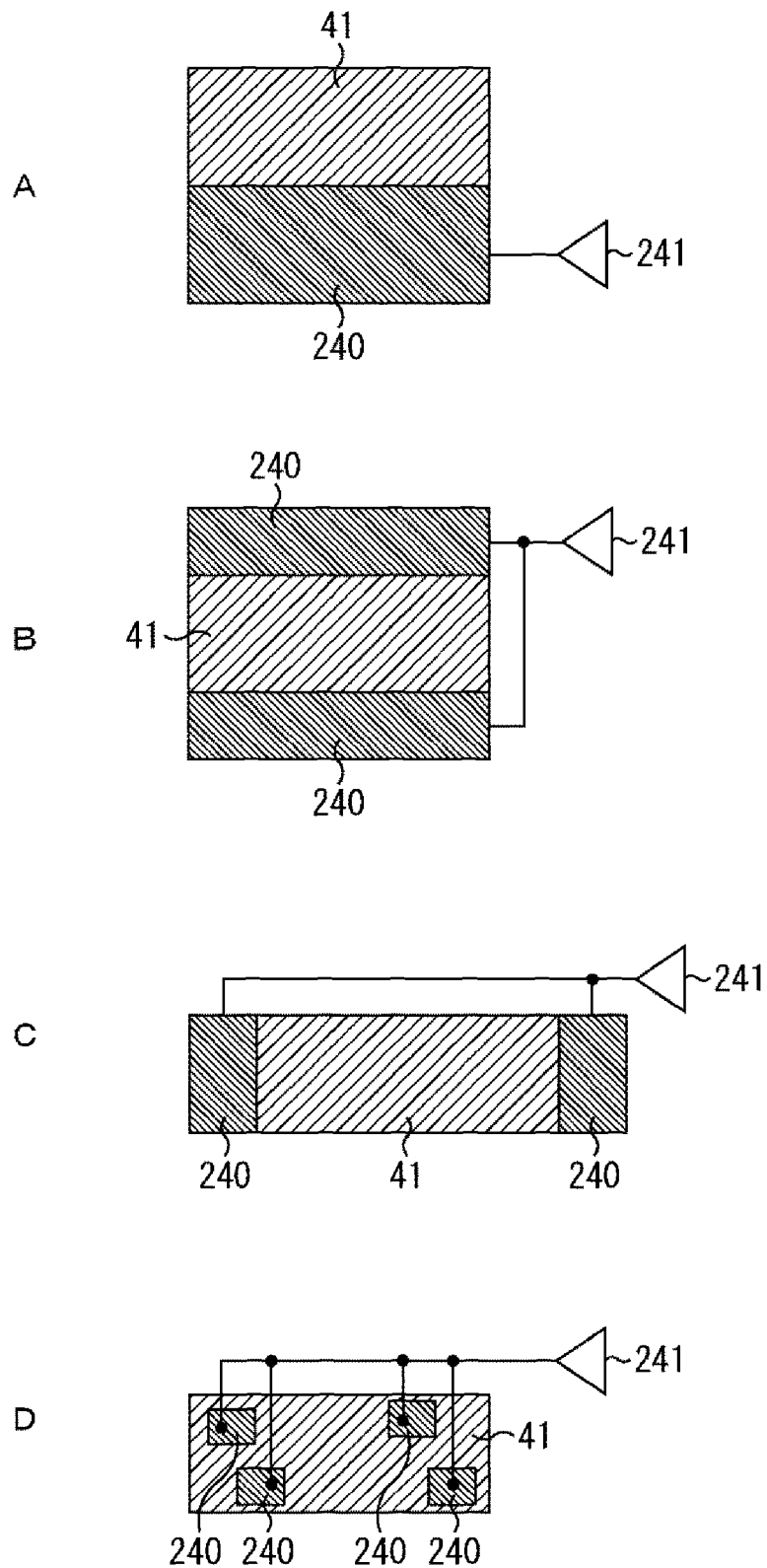
FIG. 23 is a diagram illustrating arrangement of dummy pixels.

FIG. 23 is a diagram illustrating dummy pixels for non-readout rows, the dummy pixels being separately provided from the pixels in the pixel array section 41.

FIGS. 23A to 23D illustrate non-readout rows 240 including dummy pixels for non-readout rows (hereinafter, simply referred to as the dummy pixels) which are arranged separately from the pixels in the pixel array section 41. The driving of the dummy pixels is also controlled by the system control section 45, like the pixels in the pixel array section 41.

In FIGS. 23A to 23D, the number of the dummy pixels included in each non-readout row 240 is equal to or larger than the number of the unit pixels included in the pixel array section 41. This makes it possible to provide an appropriate number of non-readout rows for the number of the charge holding section initialization rows, even in the case where the charge holding section initialization operation is performed in a batch of all pixels.

Also in the case where the charge holding section initialization is performed serially in units of a plurality of rows, it is possible to provide an appropriate number of non-readout rows for the number of the charge holding section initialization rows in the following manner. Specifically, when the sum of the number of the simultaneously resettable readout rows and the number of the non-readout rows in the pixel array section 41 is smaller than the number of the charge holding section initialization rows, the non-readout rows formed by the dummy pixels are used.

In each of FIGS. 23A to 23D, a driver 241 for driving the corresponding dummy pixels is connected to the non-readout row 240, and the driving of the driver 241 is controlled by the system control section 45. Since the dummy pixels forming the non-readout row 240 can be driven according to the same driver logic, the non-readout row 240 can employ any physical arrangement.

In other words, the non-readout row 240 may be arranged on the lower side of the pixel array section 41 as illustrated in FIG. 23A. Alternatively, the non-readout rows 240 may be arranged separately on the upper and lower sides of the pixel array section 41 as illustrated in FIG. 23B. In FIGS. 23A and 23B, each non-readout row 240 is a dummy pixel row formed in a direction of the rows in the pixel array section 41 (the right-left direction in the figure). According to the configuration particularly illustrated in FIG. 23B, it is easy to obtain correlation in position dependence of a reset power supply voltage drop and thus to have the same voltage drop in the pre-transfer reset voltage and the post-readout reset voltage with high accuracy.

In addition, the non-readout rows 240 may be arranged separately on the left and right sides of the pixel array section 41 as illustrated in FIG. 23C. In FIG. 23C, each non-readout row 240 is a dummy pixel row formed in a direction of columns in the pixel array section 41 (the up-down direction in the figure). The configuration illustrated in FIG. 23C is useful when there is room in the column direction of the pixel array section 41 in laying out a chip.

Further, the non-readout rows 240 may be arranged randomly in a pixel region of the pixel array section 41 as illustrated in FIG. 23D. The configuration illustrated in FIG. 23D is useful when there is room in laying out a pixel region of the pixel array section 41.

Meanwhile, the driving of the dummy pixels of the non-readout row 240 described with reference to FIG. 23 is performed in a batch of all pixels by the driver 241, but may be performed in such a manner that dummy pixels to be driven are selectively changed.

Figure 24:
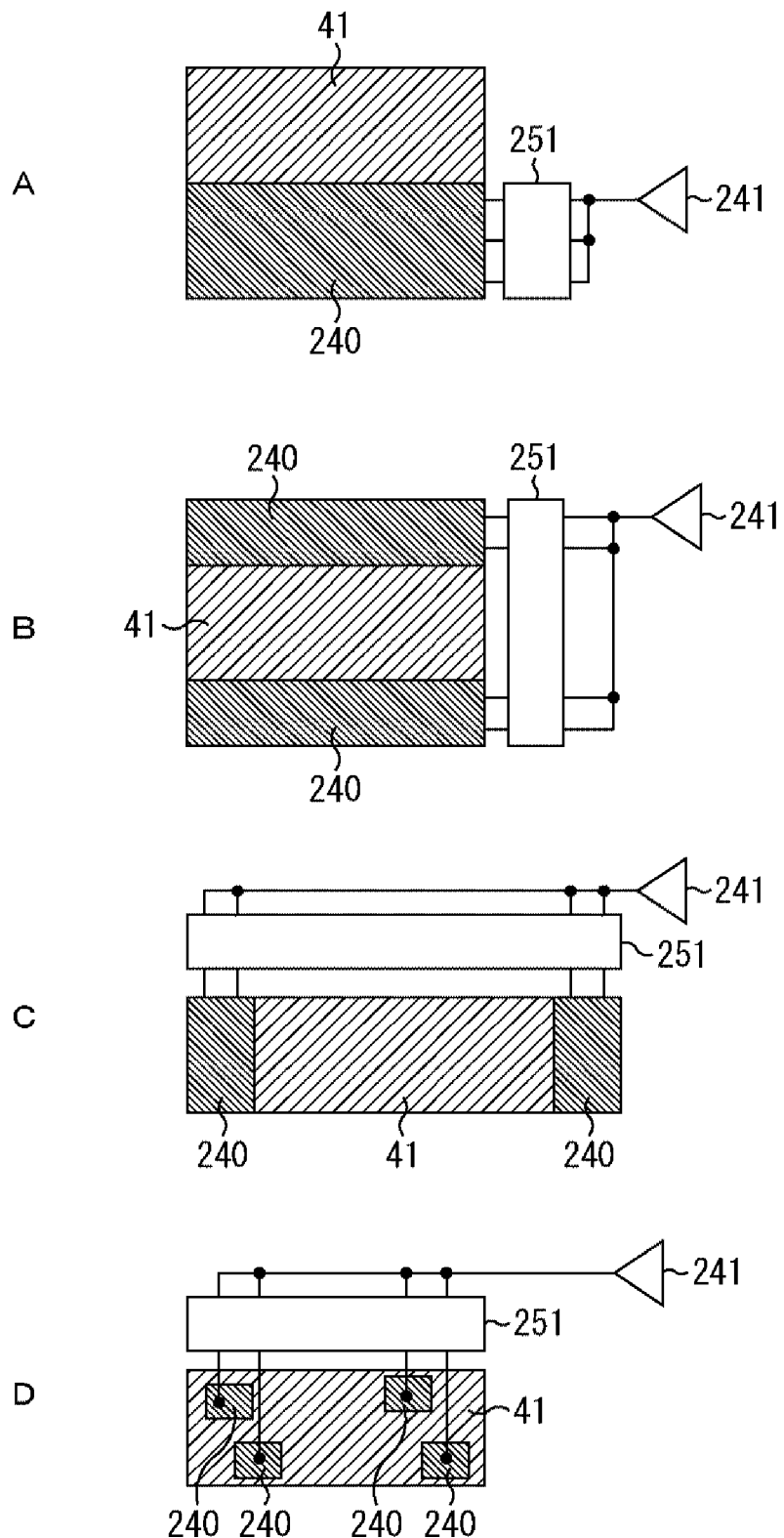
FIG. 24 is a diagram illustrating change of the number of connected dummy pixels.

FIG. 24 is a diagram illustrating a configuration in which dummy pixels to be driven are selectively changed in the non-readout rows.

FIGS. 24A to 24D illustrate configurations in which the non-readout rows 240 described with reference to FIGS. 23A to 23D are provided with switching sections 251 each changing the number of dummy pixels connected to the driver 241 driving the dummy pixels.

Each of the switching section 251 changes the number of the dummy pixels connected to the driver 241 by switching over the dummy pixels connected to the driver 241, under the control of the system control section 45.

The switching section 251 changes the number of the dummy pixels connected to the driver 241, and thereby it is possible to control the number of the non-readout rows which are reset together with the readout rows. This makes it possible to optimally adjust a voltage drop of the post-readout reset voltage and thus to have the same voltage drop in the pre-transfer reset voltage and the post-readout reset voltage with higher accuracy. Thus, it is possible to more reliably prevent occurrence of offset noise and thus to achieve a higher image quality of a captured image.

Note that in the configuration illustrated in FIG. 24, the number of dummy pixels included in the non-readout row 240 may be made larger than the number of pixels included in the pixel array section 41 to thereby increase the adjustment range of the voltage drop of the post-readout reset voltage.

Figure 25:
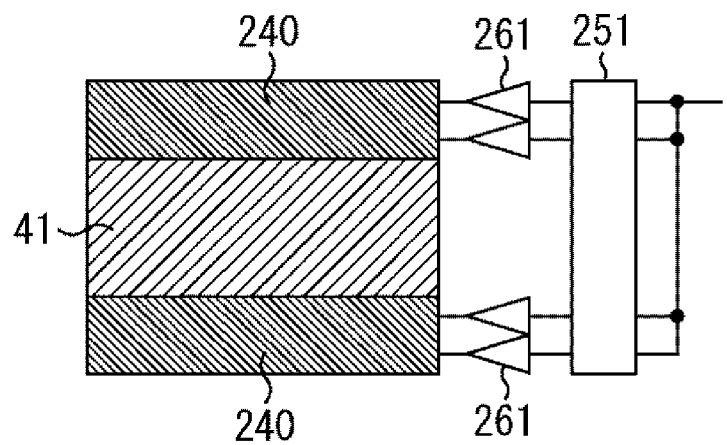
FIG. 25 is a diagram illustrating change of the number of connected dummy pixels.

In the configuration illustrated in FIG. 24, the number of driven dummy pixels is changed (selected) for output of the one driver 241. However, as illustrated in FIG. 25, the switching section 251 may change (select) the number of driven dummy pixels, by changing (selecting) output of a plurality of drives 261.

The descriptions have been given on the premise that the unit pixels in the readout rows (pixel array section 41) and the dummy pixels in the non-readout row 240 have the same specifications. On such a premise, when an appropriate number of non-readout rows (dummy pixels) for the number of the charge holding section initialization rows are provided for the case where the charge holding section initialization operation is performed in a batch of all pixels, the area necessary for pixel layout on a chip is two times of the area of the readout rows (pixel array section 41).

Meanwhile, dominant factors of voltage change of the reset power supply are considered to be the number of driven reset transistors and the capacity of the charge holding section.

Hence, the drive capability of a reset transistor and the capacity of a charge holding section in each dummy pixel in the non-readout row 240 are made larger than those of the unit pixels in the pixel array section 41. Thereby, it is possible to reduce the number of the dummy pixels and thus to reduce the area necessary for the pixel layout on the chip.

Hereinafter, a description is given of a configuration of a dummy pixel including a reset transistor having a higher drive capability and a charge holding section having a larger capacity than each unit pixel in the pixel array section 41.

[Configuration Example of Dummy Pixels]

Figure 26:
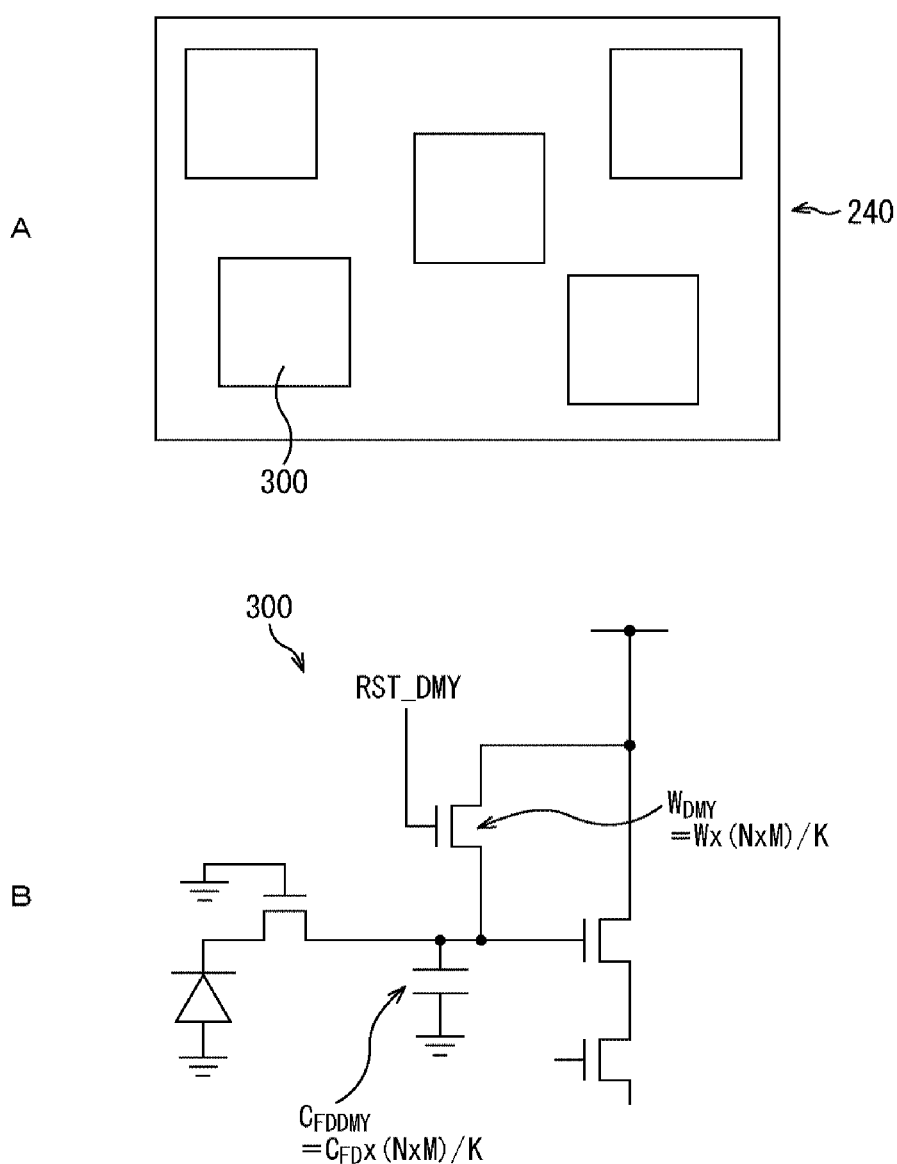
FIG. 26 is a diagram illustrating a dummy-pixel-configuration example.

FIG. 26 is a diagram illustrating dummy pixels in a non-readout row 240.

The non-readout row 240 in FIG. 26A includes K pieces of dummy pixels 300. Herein, K is 5.

Here, in the pixel array section 41 (readout rows), the number of the initialization rows where a charge holding section initialization operation is simultaneously performed is N, and the number of columns therein is M. Moreover, a gate width (W size) for determining the drive capability of a transistor of each unit pixel included in the pixel array section 41 is W, and the capacity of a charge holding section is $C_{FD}$.

In this case, as illustrated in FIG. 26B, a gate width $W_{DMY}$ of a reset transistor of each dummy pixel 300 included in the non-readout row 240 is obtained by $W \times (N \times M)/K$, and the capacity $C_{FDDMY}$ of the charge holding section thereof is obtained by $C_{FD} \times (N \times M)/K$. In other words, the drive capability of the reset transistor and the capacity of the charge holding section in each dummy pixel 300 are $(N \times M)/K$ times of those of each unit pixel in the pixel array section 41.

With such a configuration, even in the case where the number of the unit pixels where the charge holding section initialization operation is performed simultaneously is larger than the number of the dummy pixels, the total of the drive capability of the reset transistor and the capacity of the charge holding section of each unit pixel driving at the time of the charge holding section initialization operation is made equal to the total of those in each dummy pixel driving at the time of readout.

Consequently, it is possible to have the same voltage drop in the pre-transfer reset voltage and the post-readout reset voltage. Thus, it is possible to more reliably prevent occurrence of offset noise and thus to achieve a higher image quality of a captured image.

In addition, since the drive capability of the reset transistor and the capacity of the charge holding section of each dummy pixel in the non-readout row 240 can be made larger than those of each unit pixel in the pixel array section 41, it is possible to reduce the number of the dummy pixels and to reduce the area necessary for pixel layout on a chip.

Note that the drive capability of the reset transistor and the capacity of the charge holding section in each dummy pixel 300 only have to be at least $(N \times M)/K$ times of those of each unit pixel in the pixel array section 41, and may exceed those of the unit pixel.

[Another Configuration Example of Dummy Pixels]

FIG. 27 is a diagram illustrating another configuration example of dummy pixels in non-readout rows 240.

The non-readout rows 240 in FIG. 27A include K pieces of dummy pixels 300 which are arranged in a matrix form of $N' \times M'$ ($N'' \le N$, $M' \le M$). In other words, K is equal to $N' \times M'$.

In this case, as illustrated in FIG. 27B, the gate width $W_{DMY}$ of a reset transistor of each dummy pixel 300 included in each non-readout row 240 is obtained by $W \times (N \times M)/(N' \times M')$, and the capacity $C_{FDDMY}$ of the charge holding section thereof is obtained by $C_{FD} \times (N \times M)/(N' \times M')$. In other words, the drive capability of the reset transistor and the capacity of the charge holding section in each dummy pixel 300 are $(N \times M)/K$ times of those of each unit pixel in the pixel array section 41. In other words, the drive capability of the reset transistor and the capacity of the charge holding section in each dummy pixel 300 are $(N \times M)/(N' \times M')$ times of those of each unit pixel in the pixel array section 41.

According to the configuration illustrated in FIG. 27, it is also possible to obtain the same operations and advantageous effects as those in the configuration illustrated in FIG. 26.

[Still Another Configuration Example of Dummy Pixels]

Figure 28:
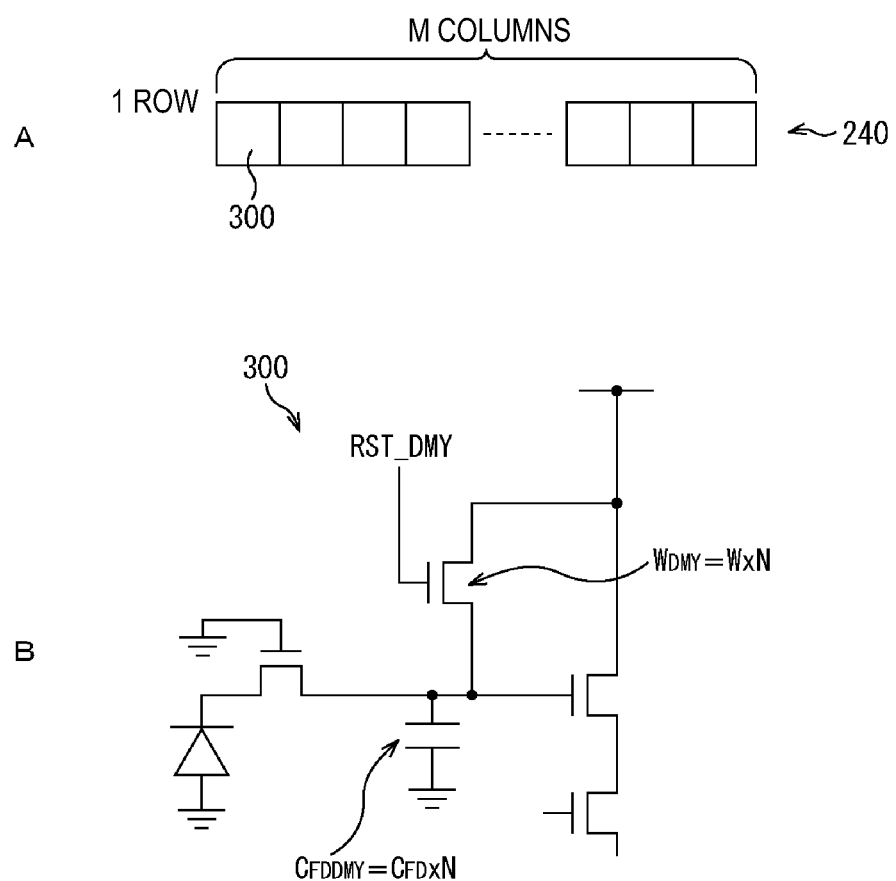
FIG. 28 is a diagram illustrating still another dummy-pixel-configuration example.

FIG. 28 is a diagram illustrating still another configuration example of dummy pixels in a non-readout row 240.

The non-readout row 240 in FIG. 28A includes K pieces of dummy pixels 300 which are arranged in a row form of $1 \times M$ (one row). In other words, K is equal to M.

In this case, as illustrated in FIG. 28B, the gate width $W_{DMY}$ of a reset transistor of each dummy pixel 300 included in the non-readout row 240 is obtained by $W \times N$, and the capacity $C_{FDDMY}$ of the charge holding section thereof is obtained by $C_{FD} \times N$. In other words, the drive capability of the reset transistor and the capacity of the charge holding section in each dummy pixel 300 are N times of those of each unit pixel in the pixel array section 41.

According to the configuration illustrated in FIG. 28, it is also possible to obtain the same operations and advantageous effects as those in the configuration illustrated in FIG. 26.

[Yet Another Configuration Example of Dummy Pixels]

FIG. 29 is a diagram illustrating yet another configuration example of dummy pixels in non-readout rows 240.

The non-readout rows 240 in FIG. 29A include K pieces of dummy pixels 300 which are arranged in a column form of $N \times 1$ (one column). In other words, K is equal to N.

In this case, as illustrated in FIG. 29B, the gate width $W_{DMY}$ of a reset transistor of each dummy pixel 300 included in each non-readout row 240 is obtained by $W \times M$, and the capacity $C_{FDDMY}$ of the charge holding section thereof is obtained by $C_{FD} \times M$. In other words, the drive capability of the reset transistor and the capacity of the charge holding section in each dummy pixel 300 are M times of those of each unit pixel in the pixel array section 41.

According to the configuration illustrated in FIG. 29, it is also possible to obtain the same operations and advantageous effects as those in the configuration illustrated in FIG. 26.

Further, in the configurations illustrated in FIGS. 26 to 29, the switching section 251 changing (selecting) dummy pixels (FIG. 24) to be driven may be used to increase the number K of the dummy pixels 300 included in the non-readout rows 240.

In addition, in the description above, the gate width is used as a factor of determining the drive capability of a reset transistor. However, a gate length (L size) may be used, or a plurality of transistors may be arranged.

Figure 30:
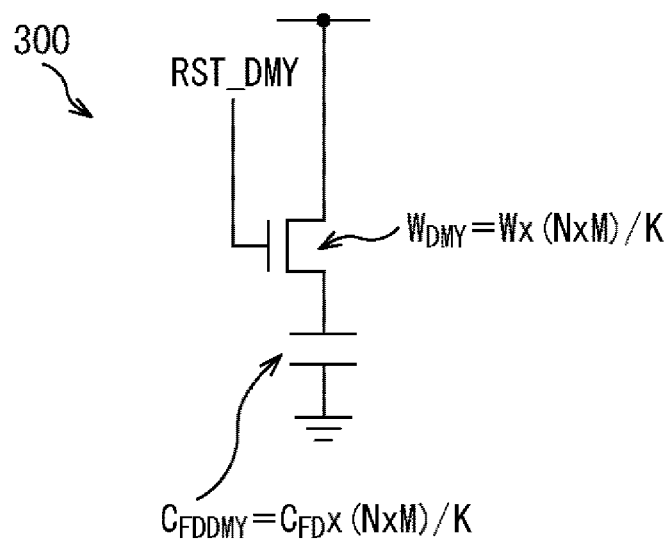
FIG. 30 is a diagram illustrating further another dummy-pixel-configuration example.

Note that as illustrated in FIGS. 26 to 29, each dummy pixel 300 includes the photo diode, the transfer gate, and the like which are elements other than the reset transistor and the charge holding section, but does not have to include these elements. In other words, as illustrated in FIG. 30, the dummy pixel 300 may include only the reset transistor and the charge holding section.

[Reset Power Supply Change in Solid-State Imaging Device in Related Art]

As described above, the charge holding section initialization before charge transfer is preferably performed at high speed to prevent the frame rate deterioration, for example, in units of a plurality of rows. The charge holding section initialization is to clamp the charge holding section to a predetermined reset power supply voltage, and is performed in row units from a viewpoint of easy designing.

In addition, the charge holding section initialization before charge transfer is performed in a well shorter cycle than a signal readout cycle (hereinafter, referred to as a readout cycle).

Meanwhile, a column-based operation such as the AD conversion or column scanning is performed in a cycle corresponding to the readout cycle. Accordingly, when only row scanning is performed in a speeded-up cycle of initializing the charge holding section, power supplies for column circuits such as an A/D conversion circuit and a column scanning circuit have power supply change in a different cycle from the initialization cycle for the charge holding section.

FIG. 31 illustrates: an example of driving the solid-state imaging device where the charge holding section initialization before charge transfer is performed serially in units of a plurality of rows not adjacent to one another; and details of the charge holding section initialization and signal readout.

As illustrated in the middle part of FIG. 31, the A/D conversion is performed in a cycle corresponding to the readout cycle. As illustrated in the lower part of FIG. 31, power supply change occurs in a power supply for the A/D conversion circuit (hereinafter, referred to as an A/D power supply) in accordance with activation/deactivation (on/off) of an operation of the A/D conversion circuit.

Further, as illustrated in the lower part of FIG. 31, the power supply change of the A/D power supply relates to cross talk between the A/D power supply and a pixel power supply, thus causing power supply change of the reset power supply. Since the power supply change cycle of the reset power supply is different from the initialization cycle of the charge holding section, the charge holding section initialization is performed in a state where the reset power supply has a high voltage in a certain row and a low voltage in a certain row. This causes a black level difference among rows (hereinafter, referred to as an inter-row difference) and hinders a higher image quality of a captured image.

Figure 32:
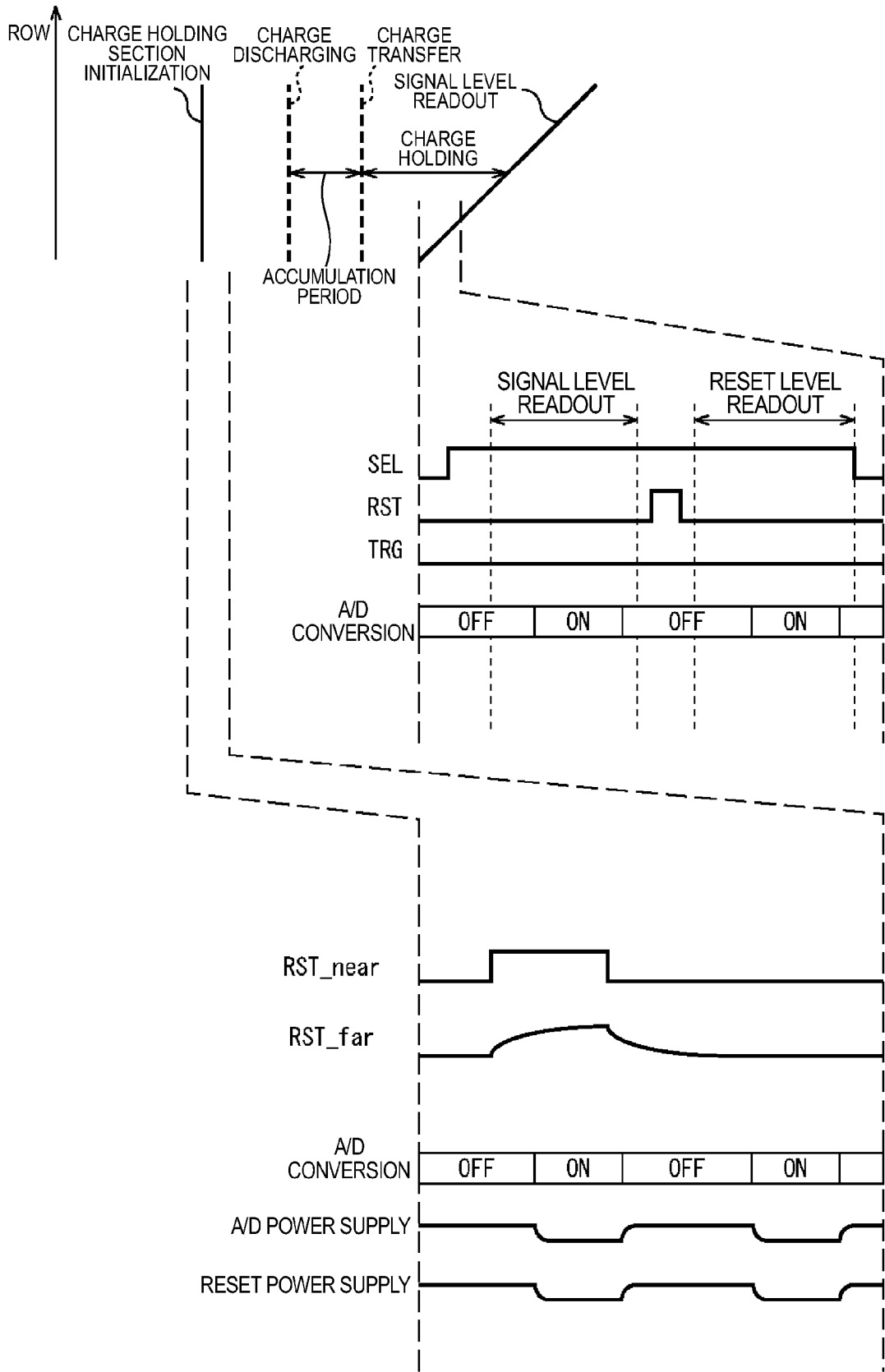
FIG. 32 is a diagram illustrating another example of driving a solid-state imaging device in related art.

In addition, FIG. 32 illustrates: an example of driving the solid-state imaging device where the charge holding section initialization before charge transfer is performed in a batch of all pixel; and details of the charge holding section initialization and signal readout.

When the charge holding section initialization is performed in a batch of all pixels, the pixel drive lines 46 (reset signal lines) which supply pixels with a drive signal RST each have a load capacitance. Accordingly, as illustrated in the lower part of FIG. 32, there is a difference in transition time between the drive signal RST_near and a drive signal RST_far, the drive signal RST_near being supplied to a pixel near the power supply for the vertical drive section 42, the drive signal RST_far being supplied to a pixel far from the power supply for the vertical drive section 42.

The transition time difference corresponds to a difference among rows in H-level change timing of a drive signal RST in the case where the charge holding section initialization is performed in units of a plurality of rows as illustrated in FIG. 31. Accordingly, the charge holding section initialization is performed in the state where the reset power supply has a high voltage in a certain row and a low voltage in a certain row. This causes the inter-row difference and hinders a higher image quality of a captured image.

Note that this is caused by not only the power supply change of the A/D power supply but also power supply change of the horizontal drive section 44 which is a column scanning circuit.

Hence, a description is given below of an embodiment of a solid-state imaging device which reliably prevents reset power supply change in initializing the charge holding section.

3. Second Embodiment of Present Technology

The CMOS image sensor 30 in FIG. 4 is applied to a solid-state imaging device according to a second embodiment of the present technology as in the first embodiment. Note that also in the present embodiment, the system control section 45 controls the voltage readout from the charge holding section in accordance with the charge holding section initialization performed by the reset transistor 64 before charge transfer performed by the transfer gate 62.

Specifically, when the transfer gate 62 performs the charge holding section initialization before charge transfer, the system control section 45 keeps activating or deactivating an operation of each of column circuits for respective columns which operates in accordance with a cycle (hereinafter, referred to as a readout cycle) of reading out a signal level and a reset level of the charge holding section.

[Driving Example of Solid-State Imaging Device]

Next, with reference to FIG. 33, a description is given of an example of driving each unit pixel in row units in the CMOS image sensor 30 which is the solid-state imaging device in the present embodiment.

Note that the unit pixel 100 in FIG. 10 is applied to the unit pixel in the present embodiment, but any of the unit pixels 100B, 100C, and 100D in respective FIGS. 12 to 14 may be applied thereto.

Like FIG. 31, FIG. 33 illustrates an example of driving the CMOS image sensor 30: performing the global shutter operation in which charge discharging and charge transfer are performed in a batch of all pixels; and serially performing the charge holding section initialization operation before charge transfer in units of a plurality of rows not adjacent to one another before charge discharging.

In the operation illustrated in FIG. 33, an operation of an A/D conversion circuit included in the column processing section 43 serving as the column circuit is kept activated during a charge holding section initialization period, that is, the power supply for the A/D conversion circuit (A/D power supply) is kept on.

According to the operation described above, the power supply change of the A/D power supply is prevented during the charge holding section initialization period, and thus cross talk between the A/D power supply and a pixel power supply does not cause the power supply change of the reset power supply, as illustrated in FIG. 33. Thus, even in the case where the readout cycle is different from the initialization cycle of the charge holding section, there arises no inter-row difference, so that it is possible to achieve a higher image quality image of a captured image.

Note that the description has been given of the example where the operation of the column circuit is kept activated, but may be kept deactivated.

[Another Driving Example of Solid-State Imaging Device]

Next, with reference to FIG. 34, a description is given of an example of driving each unit pixel in row units in the CMOS image sensor 30 which is the solid-state imaging device in the present embodiment.

The example of driving the CMOS image sensor 30 illustrated in FIG. 34 is basically the same as that illustrated in FIG. 33. However, in the operation illustrated in FIG. 34, the operation of the A/D conversion circuit included in the column processing section 43 serving as the column circuit is kept deactivated during a charge holding section initialization period, that is, the power supply for the A/D conversion circuit (A/D power supply) is kept off.

According to the operation described above, the power supply change of the A/D power supply is prevented during the charge holding section initialization period, and thus cross talk between the A/D power supply and a pixel power supply does not cause the power supply change of the reset power supply, as illustrated in FIG. 34. Thus, even in the case where the readout cycle is different from the initialization cycle of the charge holding section, there arises no inter-row difference, so that it is possible to achieve a higher image quality image of a captured image.

The descriptions have been given of the examples of respectively keeping activating and deactivating the operation of the A/D conversion circuit as the column circuit. However, part of operations of the horizontal drive section 44 serving as a column scanning circuit and a DAC (Digital Analog Converter) circuit included in the A/D conversion circuit, a counter circuit, a comparator circuit, a sense amplifier circuit, and the like which are included in the column processing section 43 may be kept activated or deactivated, that is, the power supplies for these circuits may be kept on or off.

In the descriptions given with reference to FIGS. 33 and 34 of the examples of driving the CMOS image sensor 30 performing the global shutter operation, the charge holding section initialization operation before charge transfer is performed serially in units of plurality of rows not adjacent to one another, but may be performed in a batch of all pixels before charge discharging.

Further, in the descriptions given with reference to FIGS. 33 and 34, according to the example of driving the unit pixels 100 or the like (FIG. 11), the charge holding section initialization operation before charge transfer is performed before charge discharging, but may be performed after charge discharging and before charge transfer according to the example of driving the unit pixels 50 or the like (FIG. 6).

Note that in the descriptions given with reference to FIGS. 33 and 34, the global shutter operation is performed in which the charge discharging and the charge transfer are performed in a batch of all pixels, but the charge discharging and the charge transfer are each performed in units of a plurality of rows or one row. Also in such an operation, when the charge holding section initialization before charge transfer is performed, the operation of the column circuit is kept activated or deactivated. Thereby, it is possible to obtain the same operations and advantageous effects as those in the operations described above.

4. Electronic Device to which Present Technology is Applied

Note that application of the present technology is not limited to the application to the solid-state imaging device. That is, the present technology is applicable to a general electronic device using a solid-state imaging device for an image capturing section (a photoelectric conversion section), the general electronic device including an imaging apparatus such as a digital still camera or a video camera, a mobile terminal device having an image capturing function, a copier using a solid-state imaging device for an image reading section, and the like. The solid-state imaging device may be formed as one chip or may be formed as a module having an image capturing function in which an image capturing section and either a signal processing section or an optical system are packaged together.

Figure 35:
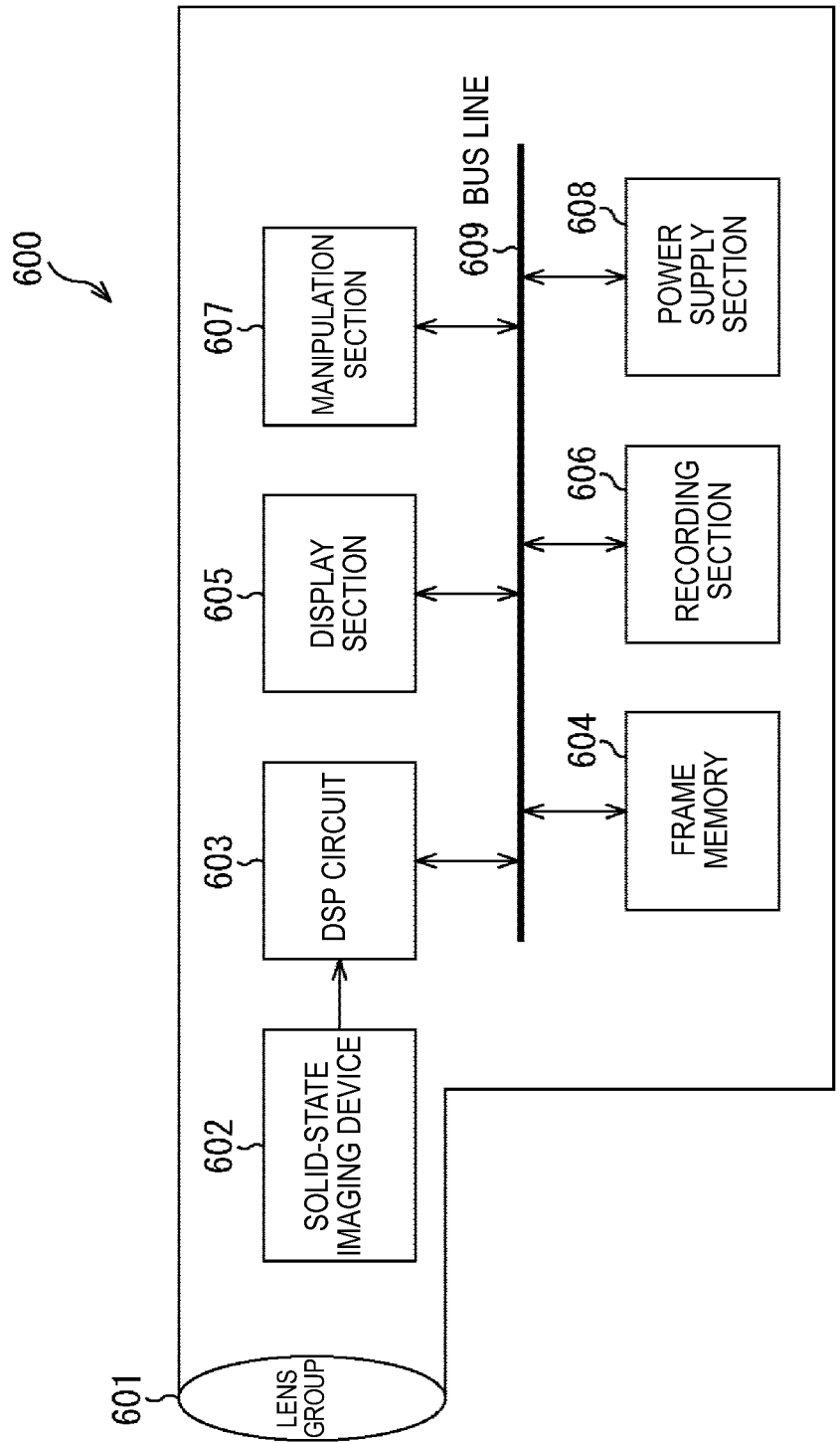
FIG. 35 is a diagram illustrating a configuration example of an embodiment of an electronic device to which the present technology is applied.

FIG. 35 is a block diagram of a configuration example of an imaging apparatus serving as an electronic device to which the present technology is applied.

An imaging apparatus 600 in FIG. 35 includes: a lens group 601 formed by a lens group or the like; a solid-state imaging device (an image-capturing device) 602 employing the aforementioned configuration of the unit pixels 50, and a DSP (Digital Signal Processor) circuit 603 which is a camera signal processing circuit. The imaging apparatus 600 also includes a frame memory 604, a display section 605, a recording section 606, a manipulation section 607, and a power supply section 608. The DSP circuit 603, the frame memory 604, the display section 605, the recording section 606, the manipulation section 607, and the power supply section 608 are connected to each other via a bus line 609.

The optical section 601 takes in incident light (image light) from a subject to form an image on an imaging surface of the solid-state imaging device 602. The solid-state imaging device 602 converts a light amount of incident light into an electrical signal on a pixel basis and outputs the electrical signal, the incident light being used for forming the image on the imaging surface by the optical section 601. It is possible to use, as the solid-state imaging device 602, a solid-state image sensor such as the CMOS image sensor 30 according to the aforementioned embodiment which is arranged on the CMOS imaging device.

The display section 605 includes a panel display device such as a liquid crystal panel or an organic EL (Electro Luminescence) panel, and displays a moving image or a still image captured by the solid-state imaging device 602. The recording section 606 records the moving image or the still image captured by the solid-state imaging device 602 in a recording medium such as a video tape or a DVD (Digital Versatile Disk).

The manipulation section 607 issues manipulation instructions for various functions of the imaging apparatus 600 in accordance with user's manipulation. The power supply section 608 appropriately supplies the DSP circuit 603, the frame memory 604, the display section 605, the recording section 606, and the manipulation section 607 with power to cause these sections to operate.

As described above, use of the CMOS image sensor 30 according to the embodiments as the solid-state imaging device 602 makes it possible to control the readout from the charge holding section in accordance with the charge holding section initialization. Thus, it is possible to achieve a high image quality of a captured image in the imaging apparatus 600 such as a video camera, a digital still camera, or further a camera module for a mobile device such as a mobile phone.

In addition, the aforementioned embodiment has been described by taking as an example the case where the present technology is applied to the CMOS image sensor including the unit pixels arranged in a matrix form, the unit pixels each sensing, as a physical quantity, a signal corresponding to a light amount of visible light. The application of the present technology, however, is not limited to the application to the CMOS image sensor. The present technology is applicable to a general column-system solid-state imaging device including a column processing section arranged for each pixel column in a pixel array section.

The application of the present technology is not limited to the application to the solid-state imaging device which captures an image by sensing distribution of incident light amounts of visible light. The present technology is also applicable to: a solid-state imaging device which captures an image based on distribution of incidence amounts of infrared rays, X-rays, particles or the like; and a general solid-state imaging device in a broad sense (a physical-quantity distribution sensing device) such as a fingerprint detection sensor which captures an image by sensing distribution of other physical quantities such as pressures or electrostatic capacitances.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A solid-state imaging device including:
a pixel array section having a plurality of unit pixels two-dimensionally arranged therein, the unit pixels each including at least
a photoelectric conversion section,
a charge holding section which holds charges accumulated in the photoelectric conversion section,
a transfer section which transfers the charges accumulated in the photoelectric conversion section to the charge holding section, and
a reset section which resets the charges in the charge holding section; and
a drive control section which controls driving of the unit pixels in a manner that a voltage as a signal level and a voltage as a reset level are each read out serially per row, the signal level corresponding to the charges accumulated in the charge holding section, the reset level corresponding to charges in the charge holding section after the reset section resets the accumulated charges,
wherein the drive control section controls readout of the voltage of the charge holding section in accordance with initialization of the charge holding section performed by the reset section before the charge transfer by the transfer section.

(2) The solid-state imaging device according to (1),
wherein the drive control section controls the driving of the unit pixels in a manner that the transfer section performs one or both of the charge transfer and charge discharging from the photoelectric conversion section in a batch of all the unit pixels in the pixel array section.

(3) The solid-state imaging device according to (1) or (2),
wherein the drive control section controls the driving of the unit pixels in a manner that the reset section performs the charge resetting in reading out the voltage of the charge holding section on a readout row and a non-readout row which is other than the readout row when a number of initialization rows is larger than a number of the readout rows in the pixel array section, the readout row including the charge holding section of which voltage is simultaneously read out, the initialization row including the charge holding section which is simultaneously initialized before the charge transfer by the transfer section.

(4) The solid-state imaging device according to (3),
wherein the non-readout row is, in the pixel array section, an omitted row where the voltage of the charge holding section is not read out, a pixel row including dummy pixels for intensity correction, or a pixel row including pixels in an OPB (Optical Black) region.

(5) The solid-state imaging device according to (3),
wherein the non-readout row includes dummy pixels provided separately from the unit pixels in the pixel array section, and
wherein the drive control section performs the driving of the unit pixels and the dummy pixels.

(6) The solid-state imaging device according to (5),
wherein the non-readout row is arranged on one or each of an upper side and a lower side of the pixel array section.

(7) The solid-state imaging device according to (5),
wherein the non-readout row has the dummy pixels arranged in a row direction of the pixel array section.

(8) The solid-state imaging device according to (5),
wherein the non-readout row has the dummy pixels arranged in a column direction of the pixel array section.

(9) The solid-state imaging device according to any one of (5) to (8), further including:
a switching section which switches over the dummy pixels to be connected to a driver driving the dummy pixels.

(10) The solid-state imaging device according to any one of (5) to (9),
wherein, when the initialization rows in N rows include the unit pixels a number of which is N×M, the drive control section controls driving of the dummy pixels a number of which is K, and
wherein each of the dummy pixels includes at least
a dummy pixel reset section having a drive capability which is substantially (N×M)/K times of a drive capability of the reset section of each of the unit pixels, and
a dummy pixel charge holding section having a capacity which is substantially (N×M)/K times of a capacity of the charge holding section of each of the unit pixel.

(11) The solid-state imaging device according to (10),
wherein the dummy pixels the number of which is K are arranged in a form of a matrix of N'×M' (N'≤N, M'≤M).

(12) The solid-state imaging device according to (1) or (2),
wherein, at a time of the initialization of the charge holding section before the charge transfer by the transfer section, the drive control section keeps activating or deactivating an operation of a column circuit which operates per column in accordance with a readout cycle for reading out the signal level and the reset level of the charge holding section.

(13) The solid-state imaging device according to (12), wherein the column circuit is an A/D (Analog to Digital) conversion circuit.

(14) The solid-state imaging device according to any one of (1) to (13), wherein the drive control section controls the driving of the unit pixels in a manner that the reset section initializes the charge holding section every a plurality of rows not adjacent to one another in the pixel array section before the charge transfer by the transfer section.

(15) The solid-state imaging device according to any one of (1) to (13), wherein the drive control section controls the driving of the unit pixels in a manner that the reset section initializes the charge holding section in a batch of all the unit pixels in the pixel array section before the charge transfer by the transfer section.

(16) The solid-state imaging device according to any one of (1) to (15), wherein the charge holding section is a charge-to-voltage conversion section connected to an amplification section that reads out the voltage of the charge holding section.

(17) The solid-state imaging device according to any one of (1) to (15), wherein the charge holding section is a capacitive element provided separately from a charge-to-voltage conversion section connected to an amplification section that reads out the voltage of the charge holding section.

(18) The solid-state imaging device according to any one of (1) to (17), further including:
a calculation section which calculates a difference between the signal level and the reset level.

(19) A method for driving a solid-state imaging device which includes
a pixel array section having a plurality of unit pixels two-dimensionally arranged therein, the unit pixels each including at least
a photoelectric conversion section,
a charge holding section which holds charges accumulated in the photoelectric conversion section,
a transfer section which transfers the charges accumulated in the photoelectric conversion section to the charge holding section, and
a reset section which resets the charges in the charge holding section; and
a drive control section which controls driving of the unit pixels in a manner that a voltage as a signal level and a voltage as a reset level are each read out serially per row, the signal level corresponding to the charges accumulated in the charge holding section, the reset level corresponding to charges in the charge holding section after the reset section resets the accumulated charges,
the method including:
controlling, by the solid-state imaging device, readout of the voltage of the charge holding section in accordance with initialization of the charge holding section before the charge transfer by the transfer section.

(20) An electronic device comprising a solid-state imaging device, the solid-state imaging device including
a pixel array section having a plurality of unit pixels two-dimensionally arranged therein, the unit pixels each including at least
a photoelectric conversion section,
a charge holding section which holds charges accumulated in the photoelectric conversion section,
a transfer section which transfers the charges accumulated in the photoelectric conversion section to the charge holding section, and
a reset section which resets the charges in the charge holding section; and
a drive control section which controls driving of the unit pixels in a manner that a voltage as a signal level and a voltage as a reset level are each read out serially per row, the signal level corresponding to the charges accumulated in the charge holding section, the reset level corresponding to charges in the charge holding section after the reset section resets the accumulated charges,
wherein the drive control section controls readout of the voltage of the charge holding section in accordance with initialization of the charge holding section before the charge transfer by the transfer section.

The present disclosure contains subject matter related to that disclosed in Japanese Priority Patent Application JP 2012-180433 filed in the Japan Patent Office on Aug. 16, 2012, the entire content of which is hereby incorporated by reference.

What is claimed is:

1. A solid-state imaging device comprising:
a pixel array section having a plurality of unit pixels two-dimensionally arranged therein, the unit pixels each including at least
a photoelectric conversion section,
a charge holding section which holds charges accumulated in the photoelectric conversion section,
a transfer section which transfers the charges accumulated in the photoelectric conversion section to the charge holding section, and
a reset section which resets the charges in the charge holding section; and
a drive control section which controls driving of the unit pixels in a manner that a voltage as a signal level and a voltage as a reset level are each read out serially per row, the signal level corresponding to the charges accumulated in the charge holding section, the reset level corresponding to charges in the charge holding section after the reset section resets the accumulated charges,
wherein the drive control section controls readout of the voltage of the charge holding section in accordance with initialization of the charge holding section performed by the reset section before the charge transfer by the transfer section,
wherein the drive control section controls the driving of the unit pixels in a manner that the reset section performs the charge resetting in reading out the voltage of the charge holding section on a readout row and a non-readout row which is other than the readout row when a number of initialization rows is larger than a number of the readout rows in the pixel array section, the readout row including the charge holding section of which voltage is simultaneously read out, the initialization row including the charge holding section which is simultaneously initialized before the charge transfer by the transfer section.

2. The solid-state imaging device according to claim 1, wherein the non-readout row is, in the pixel array section, an omitted row where the voltage of the charge holding section is not read out, a pixel row including dummy pixels for intensity correction, or a pixel row including pixels in an OPB (Optical Black) region.

3. The solid-state imaging device according to claim 1,
wherein the non-readout row includes dummy pixels provided separately from the unit pixels in the pixel array section, and
wherein the drive control section performs the driving of the unit pixels and the dummy pixels.

4. The solid-state imaging device according to claim 3, wherein the non-readout row is arranged on one or each of an upper side and a lower side of the pixel array section.

5. The solid-state imaging device according to claim 3, wherein the non-readout row has the dummy pixels arranged in a row direction of the pixel array section.

6. The solid-state imaging device according to claim 3, wherein the non-readout row has the dummy pixels arranged in a column direction of the pixel array section.

7. The solid-state imaging device according to claim 3, further comprising:
a switching section which switches over the dummy pixels to be connected to a driver driving the dummy pixels.

8. The solid-state imaging device according to claim 3, wherein, when the initialization rows in N rows include the unit pixels a number of which is N×M, the drive control section controls driving of the dummy pixels a number of which is K, and
wherein each of the dummy pixels includes at least
a dummy pixel reset section having a drive capability which is substantially (N×M)/K times of a drive capability of the reset section of each of the unit pixels, and
a dummy pixel charge holding section having a capacity which is substantially (N×M)/K times of a capacity of the charge holding section of each of the unit pixel.

9. The solid-state imaging device according to claim 8, wherein the dummy pixels the number of which is K are arranged in a form of a matrix of N'×M' (N'<N, M'<M).

10. A solid-state imaging device comprising:
a pixel array section having a plurality of unit pixels two-dimensionally arranged therein, the unit pixels each including at least
a photoelectric conversion section,
a charge holding section which holds charges accumulated in the photoelectric conversion section,
a transfer section which transfers the charges accumulated in the photoelectric conversion section to the charge holding section, and
a reset section which resets the charges in the charge holding section; and
a drive control section which controls driving of the unit pixels in a manner that a voltage as a signal level and a voltage as a reset level are each read out serially per row, the signal level corresponding to the charges accumulated in the charge holding section, the reset level corresponding to charges in the charge holding section after the reset section resets the accumulated charges,
wherein the drive control section controls readout of the voltage of the charge holding section in accordance with initialization of the charge holding section performed by the reset section before the charge transfer by the transfer section,
wherein the drive control section controls the driving of the unit pixels in a manner that the reset section initializes the charge holding section every a plurality of rows not adjacent to one another in the pixel array section before the charge transfer by the transfer section.

11. A solid-state imaging device comprising:
a pixel array section having a plurality of unit pixels two-dimensionally arranged therein, the unit pixels each including at least
a photoelectric conversion section,
a charge holding section which holds charges accumulated in the photoelectric conversion section,
a transfer section which transfers the charges accumulated in the photoelectric conversion section to the charge holding section, and
a reset section which resets the charges in the charge holding section; and
a drive control section which controls driving of the unit pixels in a manner that a voltage as a signal level and a voltage as a reset level are each read out serially per row, the signal level corresponding to the charges accumulated in the charge holding section, the reset level corresponding to charges in the charge holding section after the reset section resets the accumulated charges,
wherein the drive control section controls readout of the voltage of the charge holding section in accordance with initialization of the charge holding section performed by the reset section before the charge transfer by the transfer section,
wherein the drive control section controls the driving of the unit pixels in a manner that the reset section initializes the charge holding section in a batch of all the unit pixels in the pixel array section before the charge transfer by the transfer section.

* * * * *